United States Patent
Ghani et al.

(10) Patent No.: US 8,702,418 B2
(45) Date of Patent: Apr. 22, 2014

(54) DEVICE AND METHOD FOR EFFICIENT MIXING OF TWO STREAMS

(75) Inventors: M. Usman Ghani, Naperville, IL (US); Florian Gautier, Leval (FR); Rajani K. Varagani, Bear, DE (US); Susie Levesque, Wilmington, DE (US); Bernard Labegorre, Paris (FR); Frederic Camy-Peyret, Paris (FR); Sylvain Grillon, Meudon (FR); Pavol Pranda, Hockessin, DE (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/590,541

(22) Filed: Aug. 21, 2012

(65) Prior Publication Data

US 2012/0312207 A1 Dec. 13, 2012

Related U.S. Application Data

(63) Continuation of application No. 11/945,034, filed on Nov. 26, 2007, now Pat. No. 8,246,343, which is a continuation-in-part of application No. 11/206,730, filed on Aug. 18, 2005, now Pat. No. 7,914,279, which is a continuation-in-part of application No. 10/758,607, filed on Jan. 15, 2004, now Pat. No. 7,066,728.

(60) Provisional application No. 60/602,442, filed on Aug. 18, 2004, provisional application No. 60/605,312, filed on Aug. 26, 2004, provisional application No. 60/441,508, filed on Jan. 21, 2003, provisional application No. 60/939,215, filed on May 21, 2007, provisional application No. 60/941,594, filed on Jun. 1, 2007.

(51) Int. Cl.
*F23D 1/00* (2006.01)

(52) U.S. Cl.
USPC ........ 431/12; 431/10; 431/8; 431/9; 110/347; 110/348

(58) Field of Classification Search
USPC ............... 431/12, 10, 8, 9, 183, 65, 351, 115, 431/116, 187, 284, 354; 239/424.5, 406; 110/347, 261, 345, 344, 348; 238/8, 238/698, 699, 700; 366/101, 107
See application file for complete search history.

(56) References Cited

U.S. PATENT DOCUMENTS

| 4,445,842 | A | 5/1984 | Syska et al. |
| 4,547,150 | A | 10/1985 | Vereecke |

(Continued)

FOREIGN PATENT DOCUMENTS

| EP | 0474524 | 9/1995 |
| WO | WO 95/27872 | 10/1995 |

(Continued)

OTHER PUBLICATIONS

International Search Report and Written Opinion for PCT/IB2008/052014, mailed Jan. 14, 2010.

*Primary Examiner* — Alfred Basichas
(74) *Attorney, Agent, or Firm* — Christopher J. Cronin

(57) ABSTRACT

In one embodiment, a method for generating heat energy includes injecting a stream having a concentration of at least 50% oxygen ($O_2$ stream) into a primary gas stream through a mixer, the mixer discharging the $O_2$ stream as two or more spaced jets traversing the primary stream, thereby enriching the primary gas stream. The method further includes mixing fuel with the enriched primary gas stream, thereby forming a fuel stream; and combusting the fuel stream, thereby forming a flue gas stream.

28 Claims, 15 Drawing Sheets

(56) References Cited

U.S. PATENT DOCUMENTS

| | | |
|---|---|---|
| 4,556,384 A | 12/1985 | Laurenceau et al. |
| 4,673,348 A | 6/1987 | Riley et al. |
| 5,002,484 A | 3/1991 | Lofton et al. |
| 5,179,903 A | 1/1993 | Abboud et al. |
| 5,356,213 A | 10/1994 | Arpentinier |
| 6,272,851 B1 | 8/2001 | Mori et al. |
| 6,314,896 B1 | 11/2001 | Marin et al. |
| 6,382,110 B1 | 5/2002 | Marz |
| 6,699,031 B2 | 3/2004 | Kobayashi et al. |
| 6,854,258 B2 | 2/2005 | Moriya et al. |
| 7,066,728 B2 | 6/2006 | Chatel-Pelage et al. |
| 7,225,746 B2 | 6/2007 | Kobayashi et al. |
| 2005/0058958 A1* | 3/2005 | Kobayashi et al. ............. 431/10 |
| 2006/0040223 A1 | 2/2006 | Ghani et al. |

FOREIGN PATENT DOCUMENTS

| | | |
|---|---|---|
| WO | WO 02/04863 | 1/2002 |
| WO | WO 03/068368 | 8/2003 |

* cited by examiner

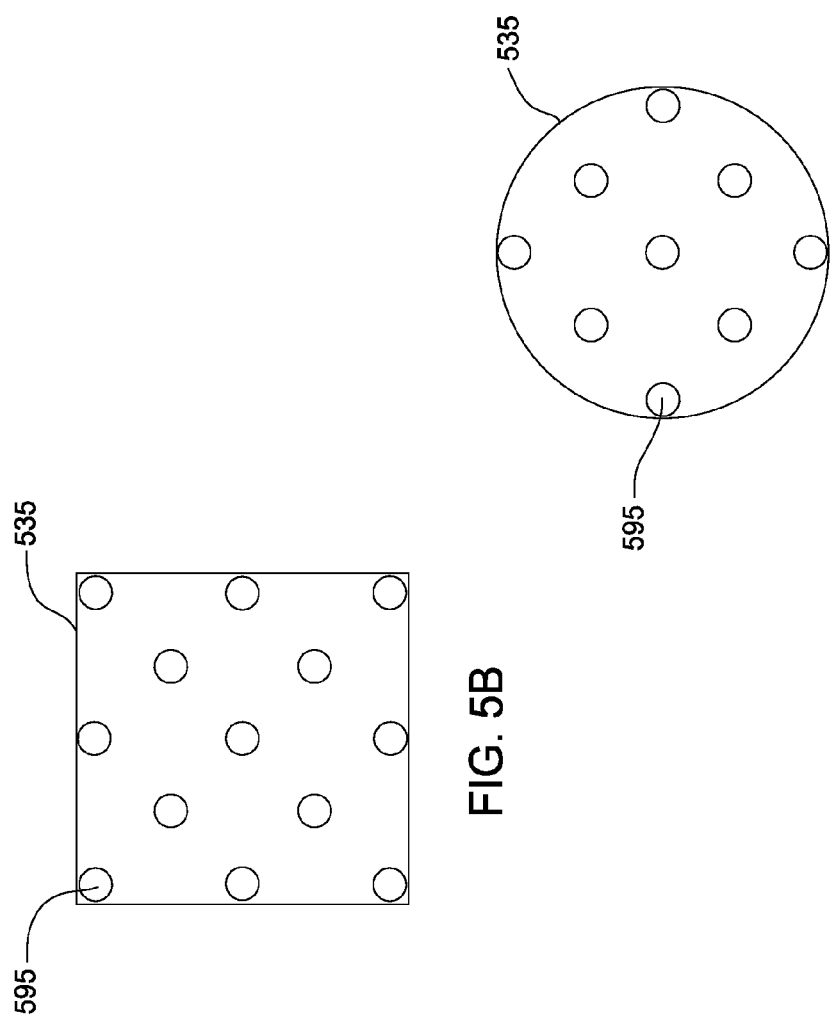

DEVICE AND METHOD FOR EFFICIENT MIXING OF TWO STREAMS

CROSS-REFERENCE TO RELATED APPLICATIONS

This application is a continuation of U.S. non-provisional application Ser. No. 11/945,034, filed Nov. 26, 2007, which claims the benefit under 35 U.S.C. §119(e) to provisional application No. 60/939,215, filed May 21, 2007, the entire contents of which are incorporated herein by reference, and which also claims the benefit under 35 U.S.C. §119(e) to provisional application No. 60/941,594, filed Jun. 1, 2007, the entire contents of which are incorporated herein by reference. Application Ser. No. 11/945,034 is also a continuation-in-part of U.S. non-provisional application Ser. No. 11/206,730, filed Aug. 18, 2005, which claims the benefit under 35 U.S.C. §119(e) to provisional application No. 60/602,442, filed Aug. 18, 2004, and provisional application No. 60/605,312, filed Aug. 26, 2004, and which is a continuation-in-part of U.S. non-provisional application Ser. No. 10/758,607, filed Jan. 15, 2004, which claims priority from U.S. provisional application No. 60/441,508, filed Jan. 21, 2003.

BACKGROUND

Coal is the most abundant fossil fuel currently available. Most of the electricity generated in the world uses coal as the fuel. Oxygen ($O_2$) enrichment during the combustion process improves combustion characteristics, both in terms of efficiency and pollutant emission levels. $O_2$ enrichment in the fuel-rich ignition zone increases the local temperature. Increasing the temperature in the fuel-rich ignition zone allows a quicker and more efficient release of volatiles contained in the pulverized fuel, thus increasing the flame stability, enhancing the combustion efficiency, enabling an easier operation and saving fuel. Increasing the temperature in the fuel-rich ignition zone also decreases the pollutant emissions, especially nitrogen oxide (or dioxide, etc., hereinafter $NO_x$) formation, since fuel-rich combustion coupled with high temperatures prevents fuel-bound nitrogen from being oxidized to $NO_x$, by reducing it to molecular nitrogen $N_2$.

The enrichment of a particle-laden stream, such as a coal/air stream, with $O_2$ poses challenges. Due to safety concerns, it is desirable to limit the $O_2$ concentration near walls of carbon steel ducts or pipes. $O_2$ injection may also disturb coal particle trajectories leading to a non-uniform loading of the particles in the stream. This could lead to pockets that are fuel lean. This, in turn, has a detrimental effect on the $NO_x$ emissions, which tend to increase under such conditions.

In addition to reducing $NO_x$ emissions, carbon dioxide ($CO_2$) emissions, not traditionally considered as a pollutant, have recently moved to the forefront of concern due to their contribution to global warming.

Therefore, there exists a need in the art for other processes of generating electricity, particularly processes that are more environmentally friendly.

SUMMARY

In one embodiment, a method for generating heat energy includes injecting a stream having a concentration of at least 50% oxygen ($O_2$ stream) into a primary gas stream through a mixer, the mixer discharging the $O_2$ stream as two or more spaced jets traversing the primary stream, thereby enriching the primary gas stream. The method further includes mixing fuel with the enriched primary gas stream, thereby forming a fuel stream; and combusting the fuel stream, thereby forming a flue gas stream.

In another embodiment, a mixer for diffusing a second gas stream into a first gas stream includes a head. The head includes a base and a plurality of vanes formed or disposed on a surface of the base, the vanes extending from a central portion of the base to a periphery of the base and, along with the base, defining flow channels. The mixer further includes an inlet having a wall and a longitudinal passage formed through the wall, the passage in fluid communication with the channels, wherein: each flow direction of each channel traverses a flow direction of the passage, and the periphery of the base extends outward past the wall of the inlet.

In another embodiment, an assembly for diffusing a second gas stream into a first gas stream includes a first conduit section. The first conduit section has a wall defining a passage therethrough. The assembly further includes a first mixer disposed in the first conduit section. The mixer includes a base; and a plurality of vanes formed or disposed on a surface of the base, the vanes extending from a central portion of the base to a periphery of the base and, along with the base, defining flow channels, wherein each flow direction of each channel traverses a flow direction of the passage. The assembly further includes a second mixer disposed in the first conduit section in longitudinal alignment with the first mixer. The second mixer includes: a base; and a plurality of vanes formed or disposed on a surface of the base, the vanes extending from a central portion of the base to a periphery of the base and, along with the base, defining flow channels, wherein each flow direction of each channel traverses the flow direction of the passage.

In another embodiment, an assembly for diffusing a second gas stream into a first gas stream includes a first conduit section. The first conduit section has an irregular wall to promote diffusion of the second gas stream into the first gas stream and a longitudinal passage formed through the wall. The assembly further includes a mixer disposed in the first conduit section proximate to the irregular wall. The mixer includes a head. The head includes a base; and a plurality of vanes formed or disposed on a surface of the base, the vanes extending from a central portion of the base to a periphery of the base and, along with the base, defining flow channels, wherein each flow direction each channel traverses a flow direction of the passage.

In another embodiment, an assembly for diffusing a second gas stream into a first gas stream includes a first conduit section. The first conduit section including a wall, a longitudinal passage formed through the wall, and a diverter, a longitudinal injector, or a shield disposed in the passage. The assembly further includes a mixer disposed in the first conduit section proximate to the diverter, longitudinal injector, or shield. The mixer includes a head. The head includes a base; and a plurality of vanes formed or disposed on a surface of the base, the vanes extending from a central portion of the base to a periphery of the base and, along with the base, defining flow channels, wherein each flow direction of each channel traverses a flow direction of the passage.

In another embodiment, a method of diffusing a second gas stream into a first gas stream includes flowing the first gas stream through a conduit. The method further includes injecting the second gas stream into the first gas stream through a mixer disposed in the conduit, the mixer discharging the stream of the second gas as two or more spaced jets traversing the first stream, thereby forming a mixed stream, wherein a concentration of the second gas in the mixed stream is C2m, a concentration of the second gas in the first gas stream is C2f, and C2m-C2f is greater than 12%.

In another embodiment, a method for generating heat energy includes injecting a stream having a concentration of at least 50% oxygen ($O_2$ stream) into a recycled flue gas stream (RFG) through a mixer, the mixer discharging the $O_2$ stream as two or more spaced jets traversing the RFG stream, thereby enriching the RFG stream. The method further includes combusting the enriched RFG stream, thereby forming a flue gas stream.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 2 is a side view of the mixer installed in one of the recycled flue gas (RFG) conduits. FIG. 2B is an end view of the mixer of FIG. 2.

FIGS. 5B and 5C illustrate arrangements of oxygen sensors for the control system, according to another embodiment of the present invention.

DESCRIPTION OF PREFERRED EMBODIMENTS

Figure 1:
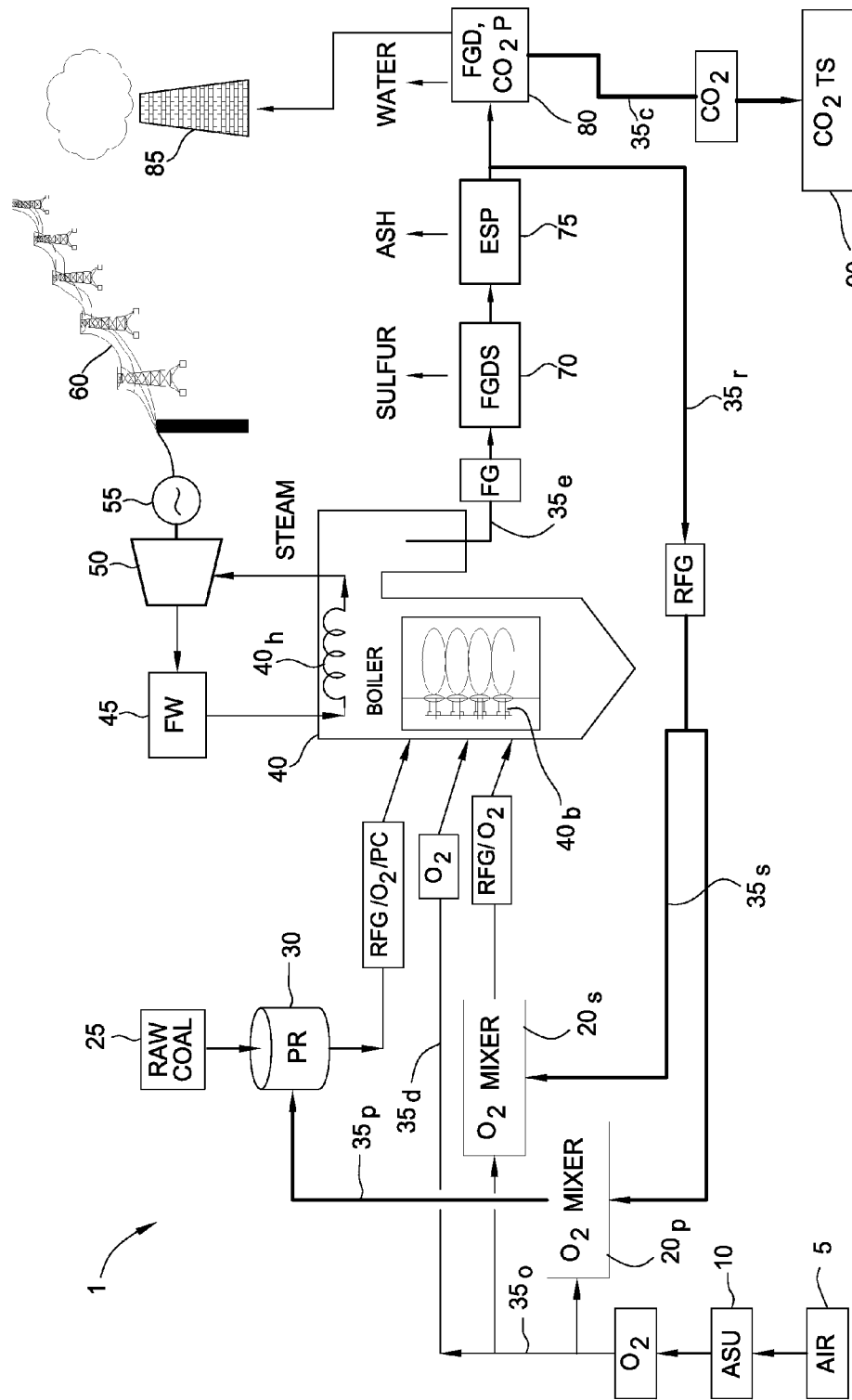
FIG. 1 is a block/flow diagram of an oxy-combustion unit/process, according to one embodiment of the present invention.

FIG. 1 is a block/flow diagram of an oxy-combustion unit/process 1, according to one embodiment of the present invention. A stream of recycled flue gas (RFG) is supplied to a primary mixer 20p via a primary conduit 35p, such as a duct or pipe. Any of the conduits discussed herein may be ducts or pipes and made from a metal or alloy, such as carbon steel, stainless steel, or inconnel, or from a ceramic. The RFG typically has an oxygen concentration of about 2-6%. A stream of fresh air 5 is supplied to an air separation unit (ASU) 10 which provides a stream of substantially pure oxygen ($O_2$), for example at least 50% $O_2$, or nearly pure $O_2$, for example at least 90% $O_2$, to the primary mixer 20p via a conduit 35o. The primary mixer 20p diffuses the $O_2$ stream into the RFG stream to form an enriched RFG stream having an increased $O_2$ concentration, for example 15-40%, 17-23.5%, or 18-21%. The enriched RFG stream travels along the primary conduit 35p to the pulverizer 30.

The pulverizer 30 is supplied with raw coal 25 and grinds the raw coal into fine particles PC which are dispersed into the enriched RFG stream, thereby forming a fuel stream RFG/$O_2$/PC. Alternatively, any other solid carbon fuel, such as coke, may be used instead of coal. Alternatively, the pulverizer 30 may be replaced with an atomizer (not shown) so that liquid hydrocarbon fuels, such as oil, may be used. The fuel stream is transported via the primary conduit 35p to one or more burners 40b. Alternatively, the primary mixer 20p may be located downstream of the pulverizer 30 between the pulverizer 30 and the burners 40b.

A stream of recycled flue gas (RFG) is also supplied to a secondary mixer 20s via a secondary conduit 35s. A stream of $O_2$ is also supplied to the secondary mixer 20s to form an enriched secondary stream RFG/$O_2$. Providing two mixers 20p,s allows oxygen concentrations of the primary and secondary streams to be independently controlled. This is advantageous where safety concerns may limit the $O_2$ concentration of the primary stream since it is transporting the PC. For example, the primary stream may be enriched to 18-21% and the secondary stream may be enriched to 21-40%. Alternatively, the primary and secondary streams may be enriched using the same mixer. The enriched secondary stream is transported to the burners 40b via the secondary conduit 35s.

A conduit 35d also supplies a direct injection (DI) stream of $O_2$ from the ASU to the burners 40b. The DI stream may be delivered directly to the burners 40b or it may be mixed with the fuel stream using a third mixer (not shown) located in the primary conduit 35p proximate to the burners. Additionally, an overfire stream of either $O_2$ or enriched RFG may be supplied to a second combustion zone in the boiler 40 (distal from the burners 40b) to allow staged combustion in the boiler 40.

The burners 40b ignite the fuel stream, thereby causing combustion to occur in a combustion chamber of the boiler 40. A stream of flue gas (FG) is formed and discharged from the boiler 40 into an exhaust conduit 35e. The flue gas stream is transported through an optional flue gas desulphurization unit (FGDS) 70 where it is treated to remove sulfur and an optional electrostatic precipitation unit (ESP) 75 where it is treated to remove ash. A substantial portion, for example at least 50% or 60-70%, of the treated flue gas stream is diverted into a recycle conduit 35r to feed the primary and secondary streams, as discussed above. In one embodiment, the remaining portion of the treated flue gas stream is fed into an optional flue gas dryer (FGD) and $CO_2$ compression unit (FGD, $CO_2$P) 80 where it is treated to remove water and compressed. In one embodiment, the compressed flue gas stream $CO_2$ is transported to an optional $CO_2$ transport and sequestration unit ($CO_2$TS) 90 via a pipe 35c where it is treated to remove impurities and sold for other uses.

The stack 85 may be used for air start-up of the unit 1 and, if the units 80, 90 are provided/used, is normally closed off during steady-state operation. Therefore, the unit 1 may be emissions free (other than minor leaks which may be minimized with make-up systems).

To generate electricity, the flue gas heats water circulated from a feedwater tank (FW) 45 through one or more heat exchangers 40h, such as tubes in a wall of the boiler, a superheater, an evaporator, and/or an economizer, located in the boiler 40, thereby forming steam or superheated steam. The steam is transported to a steam turbine 50 which drives a generator 55, thereby producing electricity. The electricity is transmitted to a power grid (not shown) via lines 60. Alternatively, the steam may be utilized as process steam.

Alternatively, the unit 1 may also be configured for air firing. In this alternative, the units 80 and 90 would not be provided/used. The stack 85 would instead be used for steady-state operation. Additionally, flue gas may or may not be recirculated in the air fired alternative.

Figure 1A:
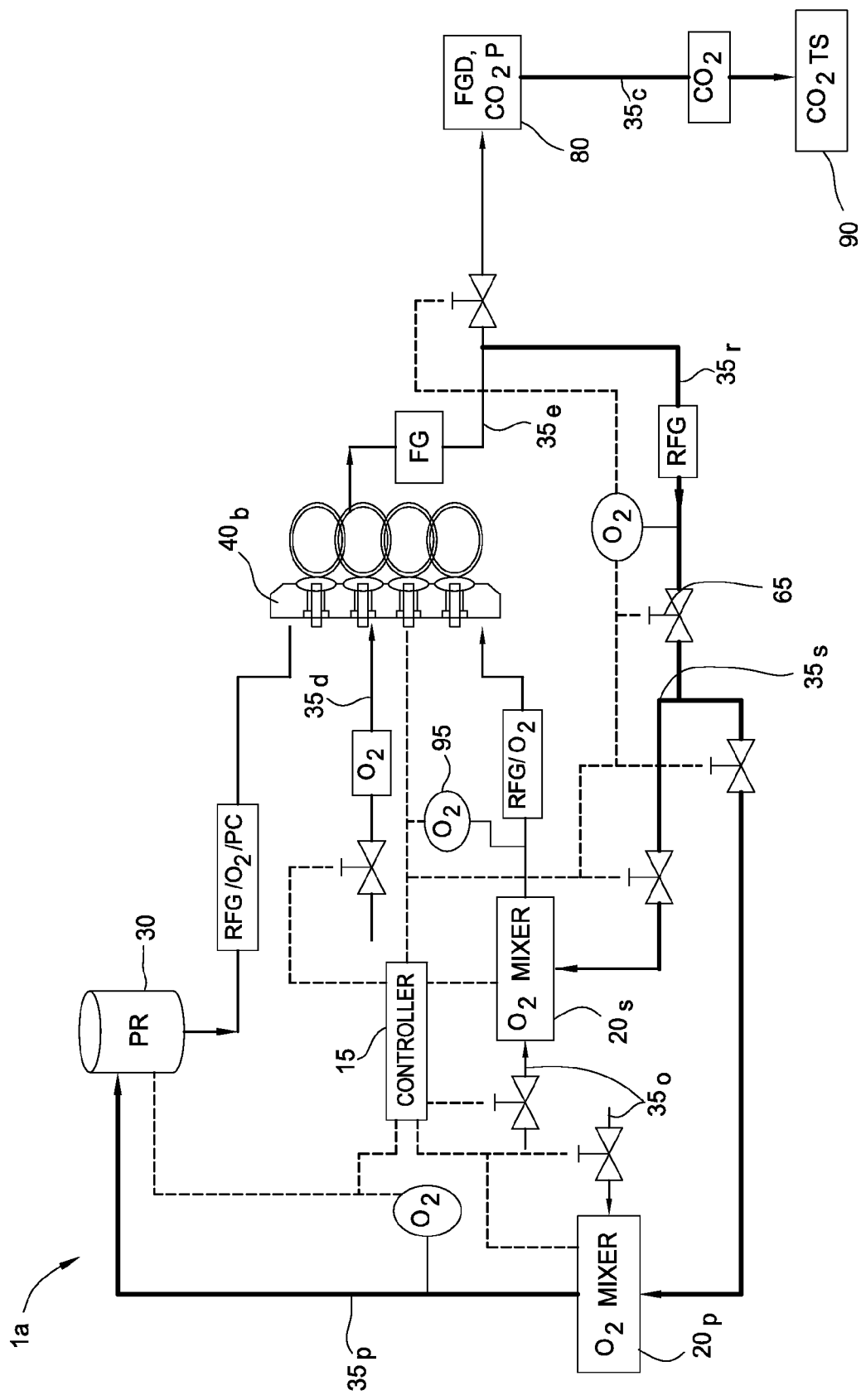
FIG. 1A is a partial flow diagram of an oxy-combustion unit/process, according to another embodiment of the present invention.

FIG. 1A is a partial flow diagram of an oxy-combustion unit/process 1a, according to another embodiment of the present invention. Portions of the unit 1a are not shown for clarity. The rest of the unit 1a may be similar to the unit 1. The unit 1a includes a control system. The control system may include a microprocessor controller 15, one or more oxygen sensors 95 in communication with the controller 15, and one or more control valves or dampers 65 actuatable by the controller 15. Connections with the controller 15 are illustrated with dashed lines which may represent electrical or other control/communication lines (i.e., hydraulic or pneumatic).

Oxygen sensors 95 may be provided downstream of each mixer 20p,s and/or in the recycle conduit 35r. Control valves or dampers 65 may be located in each of the conduits 35o feeding the mixers 20p,s in order to control the $O_2$ concentration in each of the primary and secondary RFG streams. Control valves or dampers 65 may also be located in the exhaust conduit 35e between the recycle conduit junction and the FGD,$CO_2$P 80 and in the recycle conduit 35r to control the distribution of the flue gas stream between the two. Control valves or dampers 65 may also be located in the primary and secondary conduits 35p,s upstream of the mixers 220 to control the distribution of RFG between the two. A control valve or damper 65 may also be located in the DI conduit 35d to control the flow of the DI stream. The controller 15 may also be in communication with the pulverizer to control the feed of PC and/or the burners 40b to actuate them (if they are variable). The controller may also be in communication with the mixers 20p,s to actuate them (discussed below).

Figure 2:
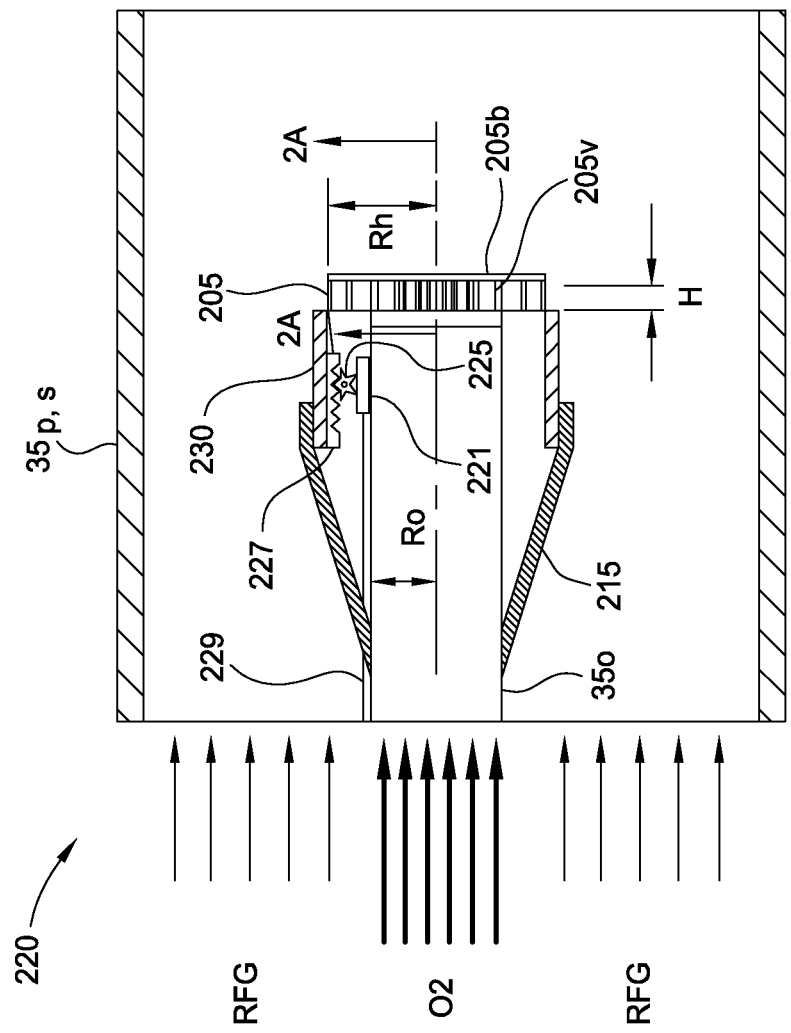
FIGS. 2-2B illustrate a mixer that is suitable for use in the oxy-combustion unit of FIGS. 1 and/or 1A, according to another embodiment of the present invention.
Figure 2A:
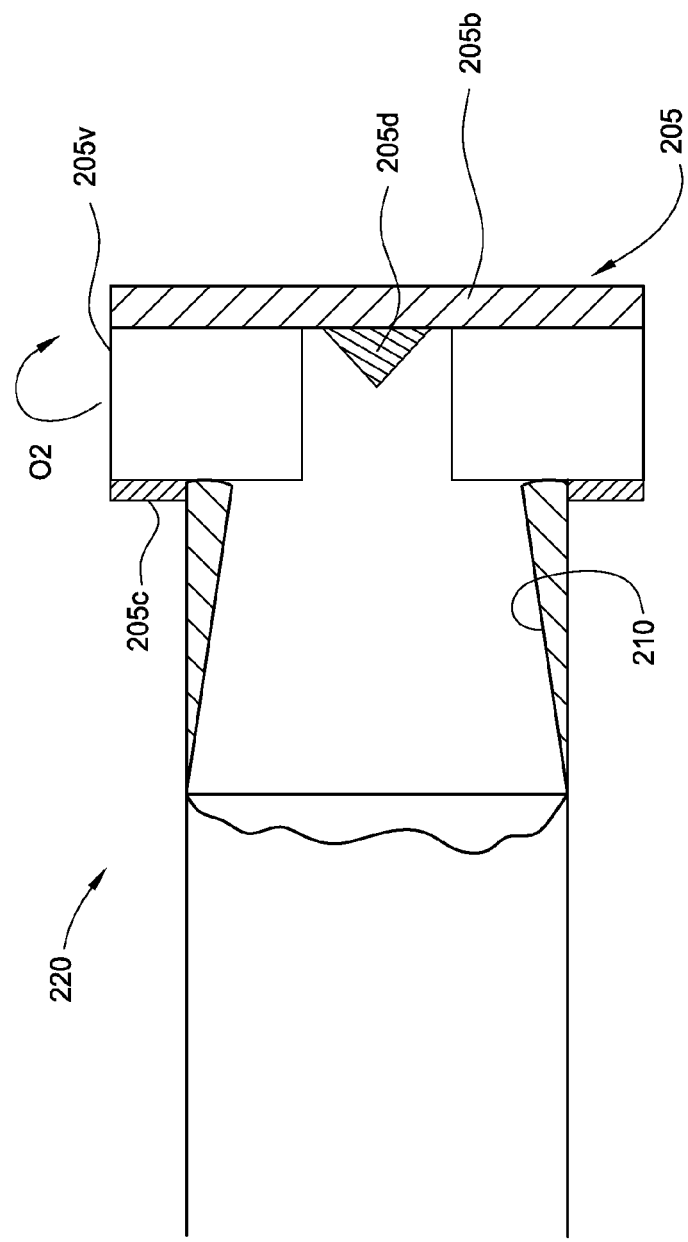
FIG. 2A is a longitudinal section view of the mixer taken along line 2A-2A of FIG. 2.
Figure 2B:
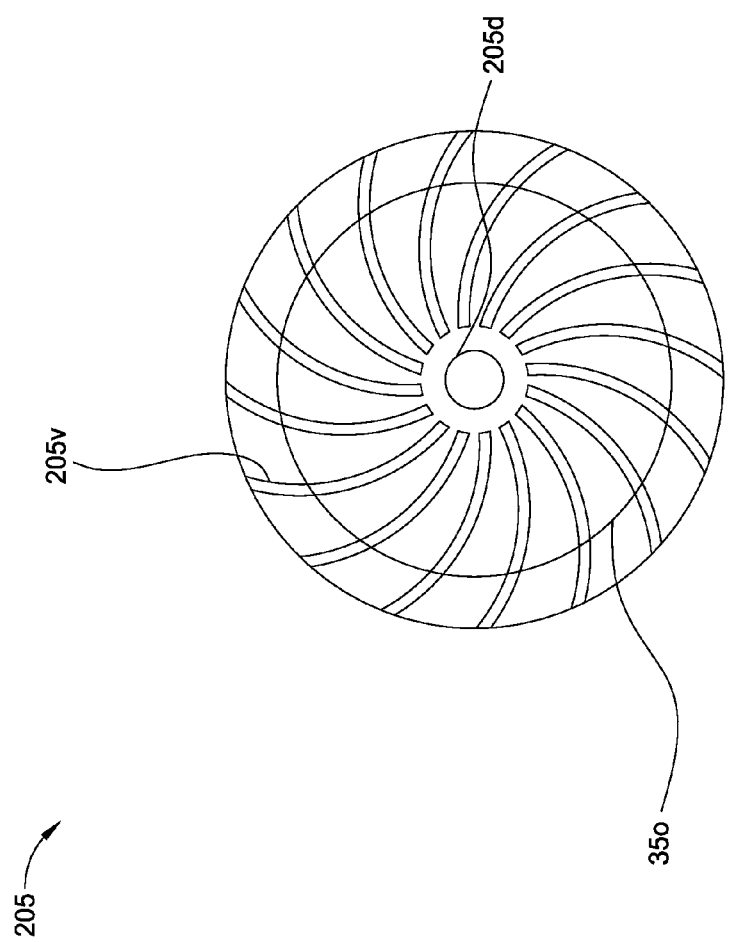

FIGS. 2-2B illustrates the mixer 220, according to one embodiment of the present invention. The mixer 220 diffuses a second gas stream, such as $O_2$, into a first gas stream, such as RFG. The mixer 220 may efficiently diffuse a large flow rate second gas stream into a large flow rate first gas stream. Additionally or alternatively, the mixer 220 may enrich the first gas stream with the second gas stream by amounts greater or substantially greater than 12%. Other specific examples of the first and second gases are discussed below.

FIG. 2 is a side view of the mixer 220 installed in one of the RFG conduits 35p,s. FIG. 2A is a longitudinal section view of the mixer 220 taken along line 2A-2A of FIG. 2. FIG. 2B is an end view of the mixer 220. The mixer 220 may be used as one or both of the mixers 20p,s. The $O_2$ conduit 35o may be introduced in the RFG conduit 35p,s either co-axially or through an elbow.

The mixer 220 may include the inlet 210, the head 205, a transition member 215, an actuator 221-229, and a valve member 230. The inlet 210 and the head 205 may be made from a metal or alloy, such as carbon steel, stainless steel, or inconnel, or from a ceramic. The head 205 may include a solid base 205b, a cover 205c, a deflector 205d, and a plurality, such as 2-16, of arcuate vanes 205v. The base 205b may be circular or rectangular and may be a plate. The cover 205c may also be circular or rectangular (corresponding to the base) and may be a plate. The deflector 205d may be a cone and may be disposed or formed on a surface of the base 205b at a center of the base. The deflector 205d minimizes stagnation of the impinging $O_2$ at the center of the base 205b.

The vanes 205b may be disposed or formed on the surface of the base 205b. The vanes 205v may extend from near a periphery of the cone 205d (near a center of the base 205b) to a periphery of the base 205b. Alternatively, the vanes 205v may abut the cone periphery or some of the vanes may abut the cone periphery and some may be gapped from the cone periphery. Alternatively, the cone 205d may be omitted and the vanes may extend from the center of the base 205b. The vanes 205v are tangentially spaced along the surface of the base, which along with the base 205b and the cover 205c, define channels. The channels provide an outlet for $O_2$ injected through the $O_2$ conduit 35o and the inlet 210 to the head 205. The $O_2$ may exit the head as two or more spaced jets traversing (i.e., in a plane substantially perpendicular or perpendicular to a longitudinal flow direction of) the RFG stream. The vanes 205v may be substantially radial proximate a center of the base 205b and tangentially curve as they extend toward a periphery of the base 205b. Alternatively, the vanes 205v may extend radially in a straight fashion. The curvature of the vanes 205v imparts both a radial and a tangential component to a velocity of $O_2$ exiting the head 205. When impacted with the longitudinally flowing RFG stream, a rapidly widening toroidal profile results in which the two gases are rapidly and intimately mixed in the required proportions.

The base 205b has a radius $R_h$ (or half-length if rectangular) which may be equal to or greater than a radius $R_o$ (or half-length if rectangular) of the oxygen conduit 35o. Having $R_h$ greater than $R_o$ allows for the vanes 205v to be extended, thereby increasing the penetration of the $O_2$ in the cross-flowing RFG. The extended blade design may produce significant improvements in the homogeneity of the RFG/$O_2$ mixture downstream of the injection when compared with prior art mixers. The cover 205c may be disposed on a surface of the vanes 205v adjacent the inlet 210 in the extended region to maintain the flow profile through the channels.

The tapered transition member 215 may be provided to smooth the flow transition from a periphery of the inlet 210 to the periphery of the base 205b. If the base 205b is circular, the member 215 may be a conical sleeve and a tapered rectangular plate if the base 205b is rectangular. The transition member 215 may be coupled to the inlet 235 or the conduit 35o. The transition member 215 also serves to shield the actuator 221-229 and the valve member 230 from accumulation of ash contained in the RFG.

The valve member 230 may be included and allows the adjustment of a height H of the oxygen channels, thereby varying the flow rate of $O_2$ exiting the head 205 for a given pressure. If the base 205b is circular, the member 230 may be a sleeve and may be a rectangular plate if the base 205b is rectangular. This variable height is useful when there is a change of fuel requiring different flow rates for the RFG and the $O_2$. Such an example would be the use of a different coal in the oxy-combustion unit 1 and/or 1a. Thus, during the change over, the valve sleeve 230 could be moved to a new position corresponding to the new flow rates of the RFG and the $O_2$. The valve sleeve 230 may be at least partially disposed in a recess of the transition sleeve 230. The valve sleeve 230 is moved by the actuator 220-229.

The actuator 220-229 may include a motor 220, a pinion 225 rotationally coupled to the motor 220, a rack 227 coupled to the valve sleeve 230 and engaged with the pinion 225, and a control line 229 providing communication between the motor and a controller, such as the controller 15. The motor 220 may be electric, hydraulic, or pneumatic. Operation of the motor 220 rotates the pinion 225 which longitudinally moves the rack 227 and thus the sleeve 230 toward or away from the periphery of the head 205. Alternatively, other types of actuators may be used.

The inlet 210 provides fluid communication between the oxygen conduit 35o and the head 205. The inlet 210 may be duct or pipe (corresponding to the oxygen conduit 35o). An inner surface of the inlet 210 may be tapered, thereby imparting an accelerated radially inward flow to further control the penetration of the $O_2$ stream exiting the head 205. The angle of the tapered surface could range from 0 (not tapered)-75 degrees or be about 45 degrees. A higher angle will accelerate the flow, increase the $O_2$ penetration, and increase the maximum $O_2$ concentration impacting the duct wall while decreasing the length needed for a uniformly mixed stream. The length, height, curvature of the vanes 205v, and the taper angle are designed based upon a number of factors, such as the acceptable maximum concentration of the gas being mixed in the RFG stream, downstream length available for mixing, and the desired mixing profile. The inlet 210 may be attached to the vanes 205v (i.e., by welding) and may be connected to the oxygen conduit 35o by a suitable joint (i.e., threaded, flanged or welded). The cover 205c may be attached (i.e., by welding) to the vanes 205v and/or the inlet 210.

Figure 3:
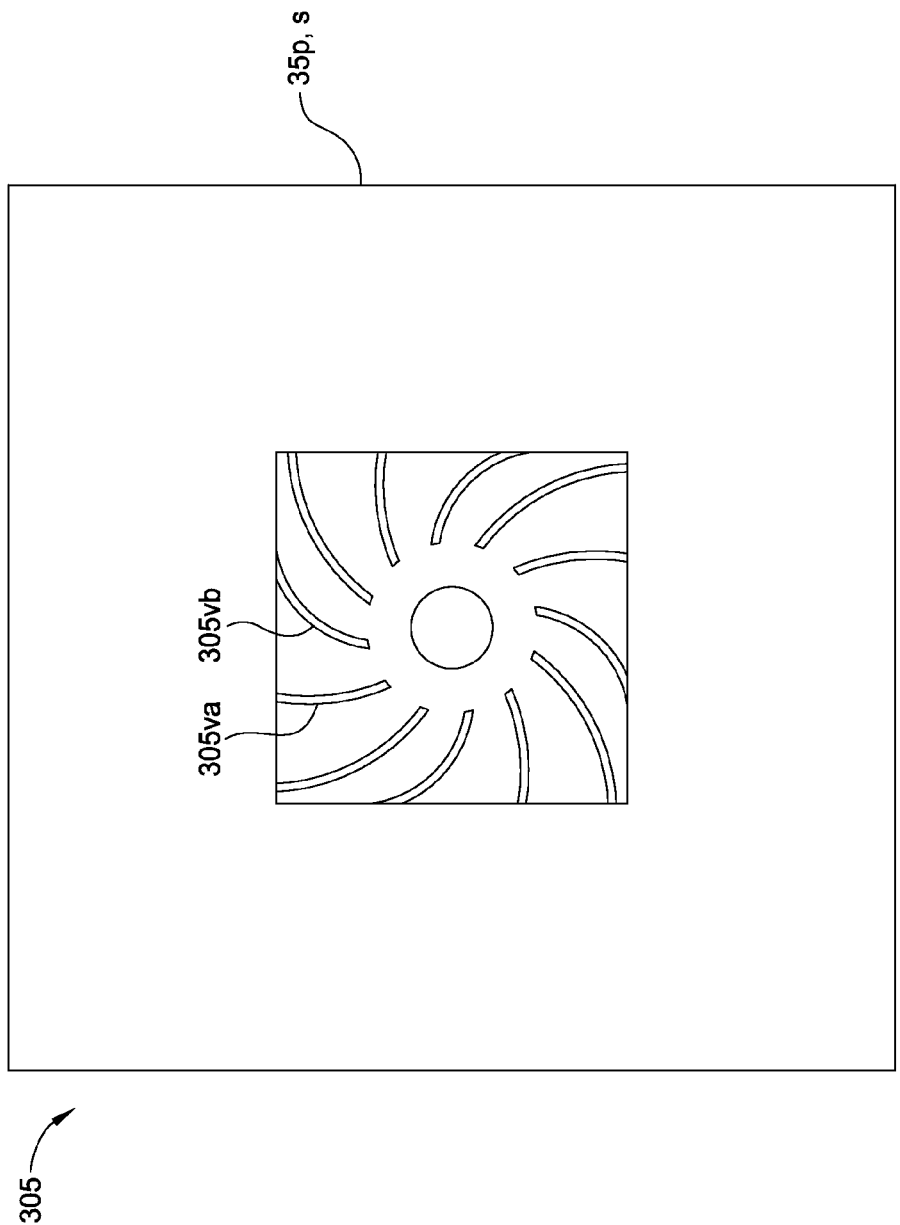
FIG. 3 is an end view of a mixer head, according to another embodiment of the present invention.

FIG. 3 is an end view of a mixer head 305, according to another embodiment of the present invention. The mixer head 305 may be substituted for the mixer head 205. One or more of the RFG conduits 35p,s and the $O_2$ conduit 35o are rectangular ducts. The head 305 is also rectangular. In order to provide for homogeneous mixing of the two gases RFG and $O_2$ in corners of the RFG ducts 35p,s, vanes 305va have a first curvature and vanes 305vb, oriented toward corners of the head 305 (which also correspond to corners of the RFG duct 35p,s), have a second curvature. The second curvature is greater or substantially greater than the first curvature, thereby accelerating $O_2$ streams exiting near the corners of the head 305 to a greater velocity than the rest of the $O_2$ streams exiting the head 305 to ensure mixing in the corners of the RFG ducts 35p,s.

Figure 4:
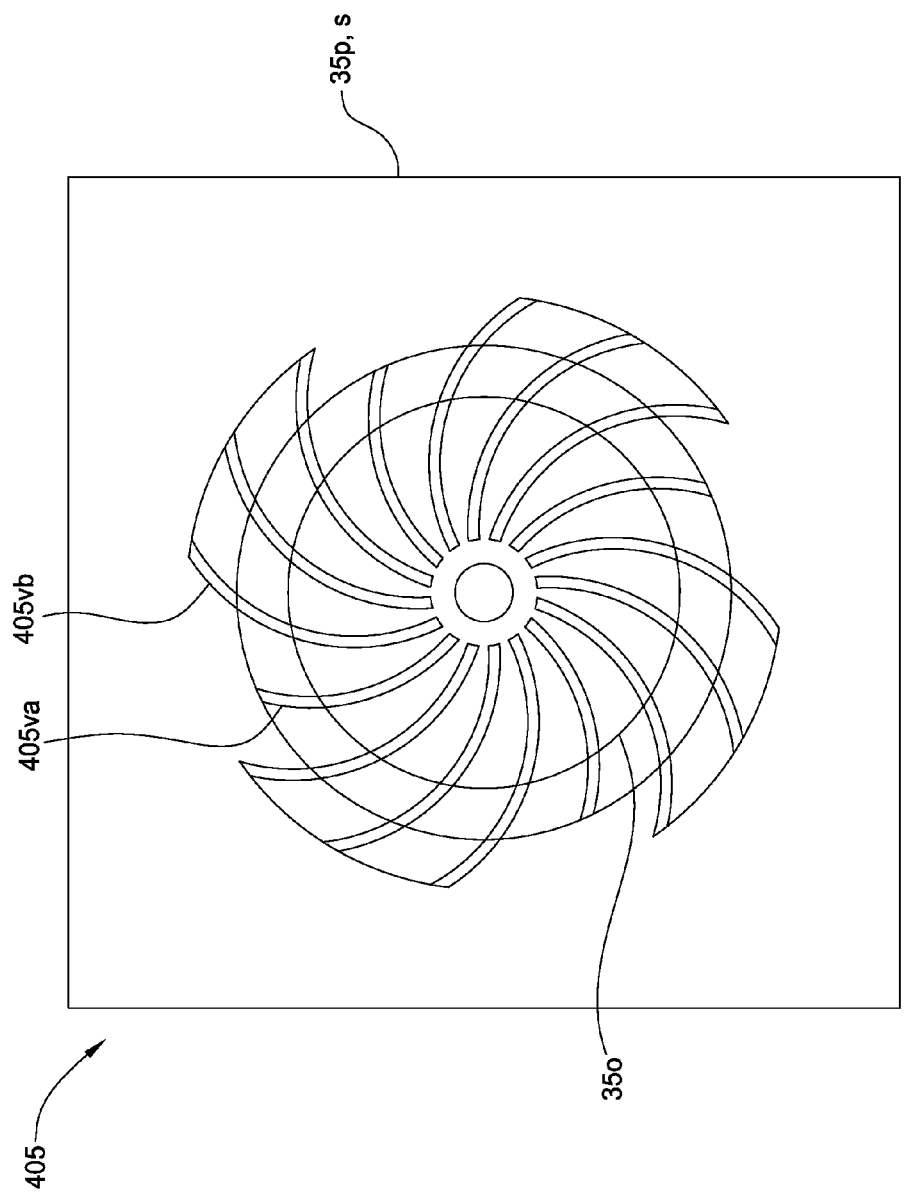
FIG. 4 is an end view of a mixer head, according to another embodiment of the present invention.

FIG. 4 is an end view of a mixer head 405, according to another embodiment of the present invention. The mixer head 405 may be substituted for the mixer head 205. One or more of the RFG conduits 35p,s are rectangular ducts. The $O_2$ conduit 35o is a pipe and the head 305 is circular. In order to provide for homogeneous mixing of the two gases RFG and $O_2$ in corners of the RFG ducts 35p,s, vanes 405va have a first radius and vanes 405vb, oriented toward corners of the duct 35p,s, have a second radius. The second radius is greater or substantially greater than the first radius which may accelerate flow outward, thereby ensuring mixing in the corners of the RFG ducts 35p,s.

Figure 5:
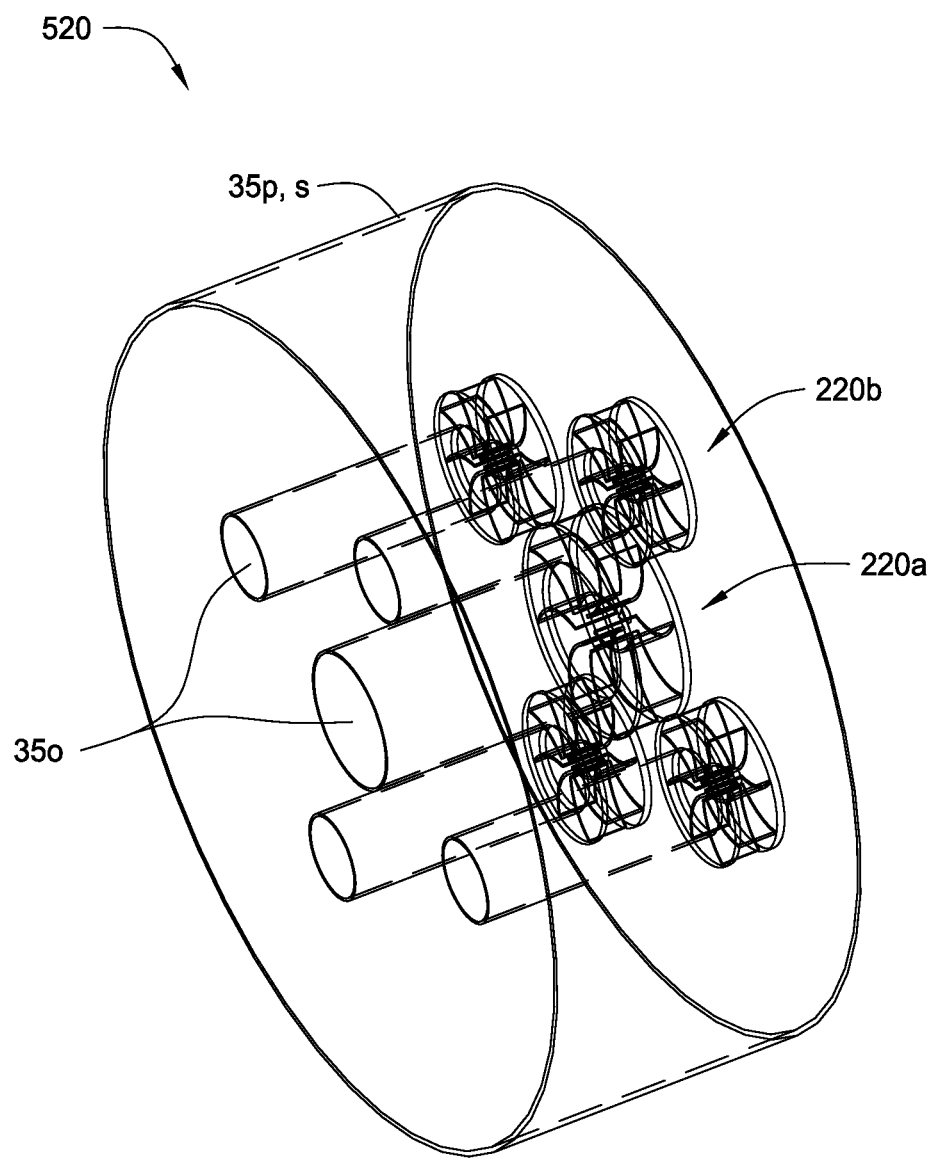
FIG. 5 illustrates an arrangement of mixers, according to another embodiment of the present invention.

FIG. 5 illustrates an arrangement 520 of mixers 220a,b, according to another embodiment of the present invention. The mixer arrangement may be used as one or both of the mixers 20p,s. The arrangement 520 is advantageous for increased enrichment and/or mass quantities of mixing. As shown, the arrangement 520 includes a central mixer 220a surrounded by a plurality of smaller mixers 220b. Each mixer 220a,b is connected to the $O_2$ conduit 35o. The arrangement 220p,s is a parallel (i.e., coplanar), staggered arrangement. Alternatively, the arrangement may be an in-line arrangement. Alternatively, the mixers 220a,b may be the same size (see mixer arrangement 1020 of FIG. 10, discussed below) and/or there may be two or more mixers 220a,b in the arrangement 520. Alternatively, instead of the parallel arrangement, a first mixer may be located at a first longitudinal location along one of the RFG conduits 35p,s and a second mixer may be located at a second longitudinal location along the one of the RFG conduits 35p,s which longitudinally spaced from the first location, thereby providing a serial arrangement.

For rectangular ducts 35p,s, a cross-section of the duct may be divided into subsections and one of the mixers 220a,b may be disposed in a center of each sub-section. For non-square rectangular ducts 35p,s, the subsections may be square.

Figure 5A:
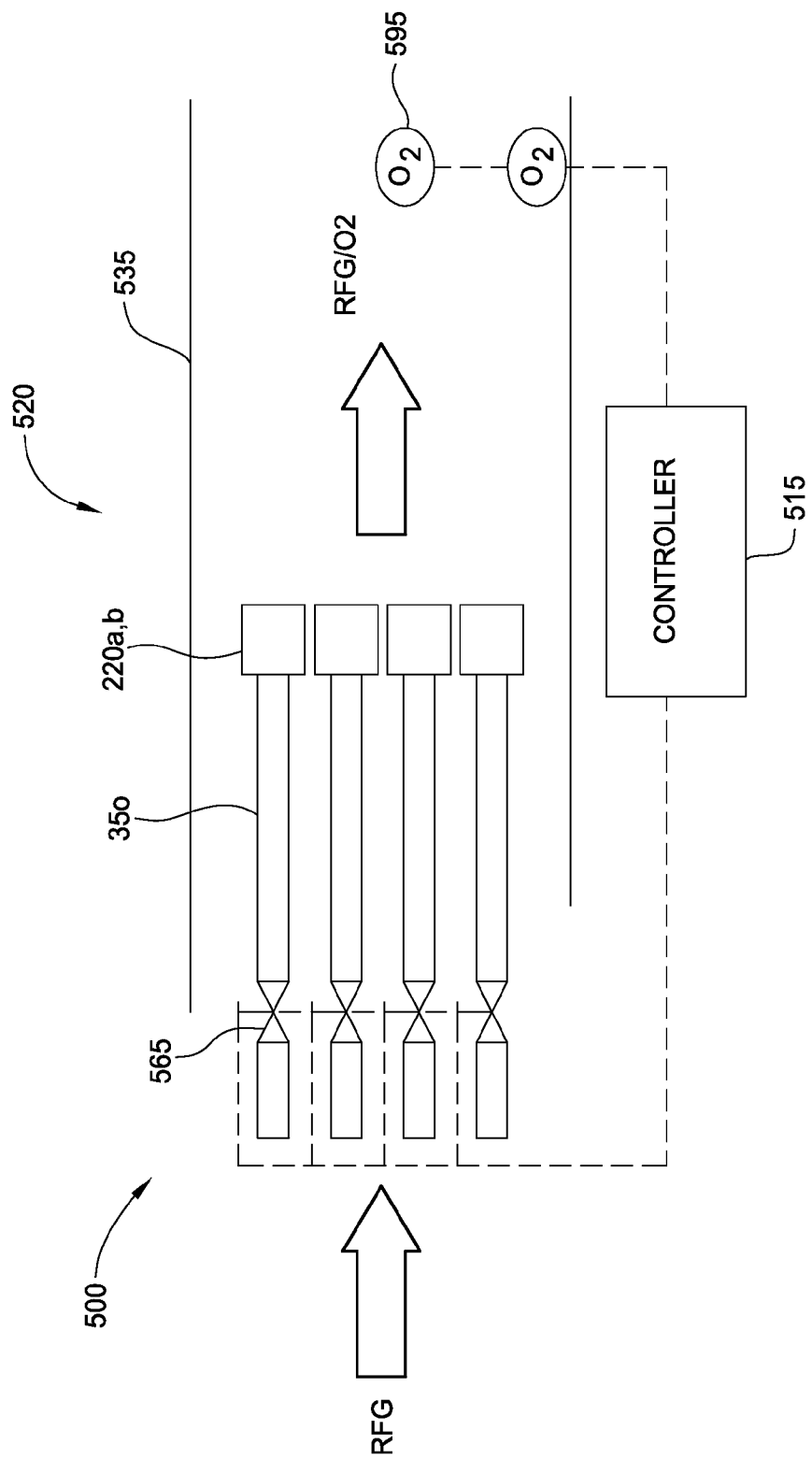
FIG. 5A illustrates a control system for the mixer arrangement, according to another embodiment of the present invention.

FIG. 5A illustrates a control system 500 for the mixer arrangement 520, according to another embodiment of the present invention. The control system 500 may posses the capability to adjust the flow rates through each of the mixers 220a,b in the arrangement 520, thereby controlling local oxygen concentrations at discrete points in the transient mixing profile downstream of the arrangement 520. The control system may monitor the local oxygen concentrations at discrete points in the transient mixing profile to ensure homogenous mixing throughout the transient mixing profile.

The control system 500 may include a microprocessor controller 515, one or more $O_2$ sensors 595 in communication with the controller 515, and a control valve or damper 565 for each $O_2$ conduit 35o and actuatable by the controller 515. The $O_2$ sensors 595 may be disposed in a modified RFG conduit section 535 at a longitudinal location downstream from and proximate to the mixer arrangement 520 in a transient mixing region and/or downstream and distal from the mixer arrangement 520 in a homogenous region. Additionally, there may be several rows of $O_2$ sensors 595 in the transient mixing region. The $O_2$ sensors 595 may be located at pre-selected locations, for example a sensor 595 located in a center of the conduit 535, and a sensor located at a wall of the conduit 535 to ensure that the RFG/$O_2$ stream is homogeneous. The number and arrangement of the sensors 595 may depend on a number of factors, such as the number of mixers 220a,b in the arrangement 520, the size of the conduit 535, and the shape of the conduit 535. FIGS. 5B and 5C illustrate a more complex sensor arrangement for the RFG duct 535 and an RFG pipe 535, respectively.

The $O_2$ concentration of the RFG/$O_2$ stream may be measured by the sensors and the flow rate of $O_2$ through the mixers 520a,b may be controlled to maintain the desired $O_2$ enrichment. Further, the $O_2$ concentration of the RFG/$O_2$ stream may be measured at discrete locations throughout a cross section of the conduit 535 and an individual $O_2$ flow rate may be controlled through each mixer 220a,b to ensure homogenous mixing.

The larger central mixer 220a has a greater flow capacity than the smaller peripheral mixers 220b for a given pressure in the $O_2$ conduit 35o. This flow capacity variance provides better control of the mixing process during transient operation, such as turn-down and startup conditions. During a turn down situation, for example when the unit 1,1a is operating at 40% of normal operating capacity, flow rates through the mixers 220a,b may be correspondingly reduced to a 40% level. For a start-up condition, the flow rate through the central mixer 220a may be at a 100% or greater level while the peripheral mixers 220b are completely shut-in. As the conditions change from the start-up to the normal operating conditions, the flow rates may be adjusted through the mixers 220a,b, for example flow through the mixers 220a,b could range from 0% to 200% of the normal operating capacity or may be limited to 120% of the normal operating capacity.

Figure 6:
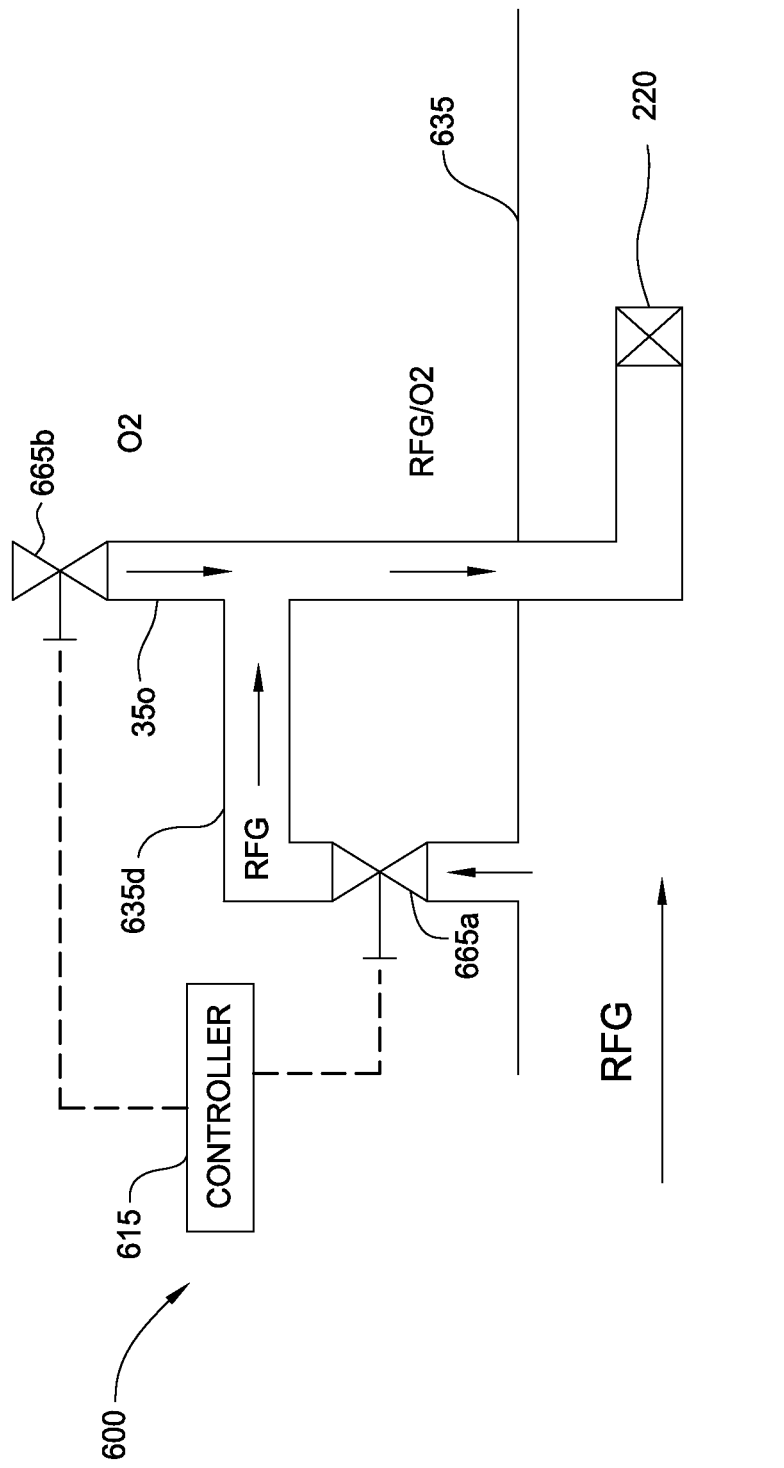
FIG. 6 illustrates a system for transient operation of the mixer, according to another embodiment of the present invention.

FIG. 6 illustrates a system 600 for transient operation of the mixer 220, according to another embodiment of the present invention. The control system 600 possesses the capability to selectively adjust the $O_2$ concentration in the $O_2$ conduit 35o during transient operation, thereby allowing for a normal flow rate to be maintained through the mixer 220 while retaining the capability to adjust the flow rate of $O_2$ to the mixer to accommodate the transient operation.

The system 600 may be used with one of the RFG conduits 35p,s or both. The system 600 may include a dilution conduit 635d in fluid communication with a modified RFG conduit section 635 and the $O_2$ conduit 35o and a control valve or damper 665a disposed in the dilution conduit 635d and in communication with a controller 615 and a control valve or damper 665b disposed in the $O_2$ conduit 35o and in communication with the controller 615. During transient conditions, a portion of the RFG stream is diverted to the $O_2$ stream via the dilution conduit 635, thereby diluting the $O_2$ stream. The control valves 565a,b allow the controller to control the dilution of the transient $O_2$ stream. Dilution of the $O_2$ stream allows a normal flow rate to be supplied to the mixer 220 during transient conditions while still being able to control the flow rate of $O_2$ injected by the mixer 220.

Alternatively, instead of diluting the $O_2$ stream with a portion of the RFG stream, the O2 stream may be diluted with a gas, such as nitrogen or carbon dioxide, supplied from an external source (not shown) or the ASU 10.

Figure 7A:
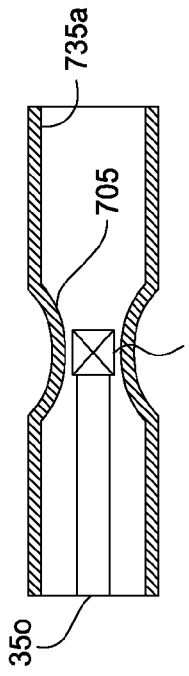
FIGS. 7A-D illustrates a modified RFG conduit for use with the mixer, according to another embodiment of the present invention.

FIGS. 7A-D illustrates modified RFG conduit sections 735a-d for use with the mixer 220, according to another embodiment of the present invention. Any of the modified RFG conduit sections 735a-d may be used with one of the RFG conduits 35p,s or both. In FIG. 7A, a protrusion 705 is disposed on or formed on an inner surface of the conduit 735a proximate to the mixer 220. The protrusion 705 may be elliptical or circular in cross-section. Other shapes, such as polygons, may work as well. If the conduit 735p,s is a pipe, the protrusion 705 may continuously extend around the inner surface as a ring, may be discontinuous around the inner surface resembling a wavy profile, or may be discontinuously spaced, for example two protrusions 180 degrees apart or four protrusions 90 degrees apart. If the conduit 735p,s is a rectangular duct, the protrusion 705 may extend continuously along each side of the inner surface or be discontinuously located at the center of each side of the inner surface, in the corners of the sides, or both.

Figure 7B:
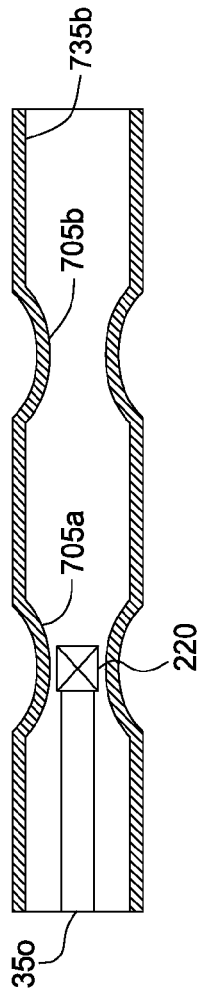
Figure 7C:
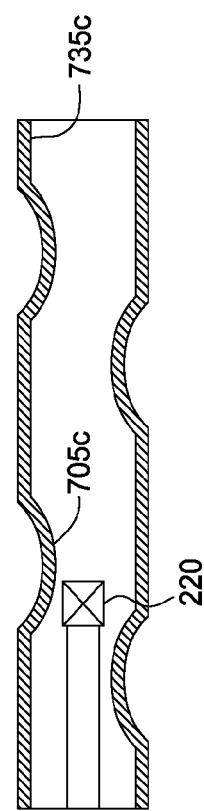

In FIG. 7B, a second protrusion 705b is added, which is longitudinally spaced from the first protrusion 705a. The protrusions 705a,b may each be similar to the protrusion 705. In FIG. 7C, the protrusion 705c extends tangentially around and longitudinally along the conduit 735c. If the conduit 735c is a pipe, the protrusion 705c may extend continuously as a helical thread or may be discontinuous as discussed for the protrusion 705. If the conduit 735c is a duct, a first protrusion may extend continuously along a first side at a first longitudinal location and a second protrusion extend along a second side at a second longitudinal location which is longitudinally spaced from the first longitudinal location and so on or may be discontinuous as discussed for the protrusion 705.

Figure 7D:
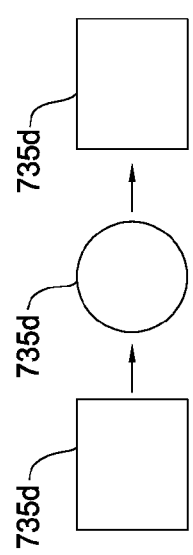

FIG. 7D illustrates a cross-section of the conduit section 735d at three longitudinal locations starting at a first subsection (left) and extending downstream from the first subsection. The conduit section 735d begins (first sub-section, left) as a conventional duct having a rectangular cross-section and then transitions into an elliptical or circular cross-section (second sub-section, middle) and then transitions back to a rectangular cross-section (third sub-section, right). The mixer (not shown) may be disposed proximate to the second subsection. The modified conduit sections 735a-d accelerate the RFG stream radially inward flow inducing turbulence, thereby improving the level of mixing and reducing the distance needed for the homogenously mixed RFG/$O_2$ stream.

Figure 8:
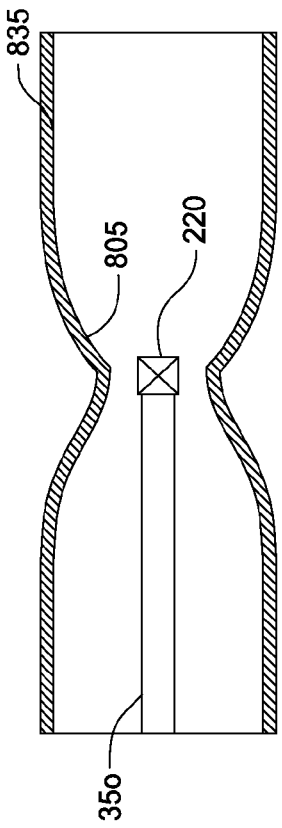
FIG. 8 illustrates a modified RFG conduit for use with the mixer, according to another embodiment of the present invention.

FIG. 8 illustrates a modified RFG conduit section 835 for use with the mixer 220, according to another embodiment of the present invention. The modified RFG conduit section 835 may be used with one of the RFG conduits 35p,s or both. A converging-diverging (C-D) profile 805 is formed in the conduit 835 proximate to the mixer 220. The mixer 220 may be located at a junction of the converging-diverging profile 805. As with the modified conduits 735a-d, the modified conduit 835 improves mixing of the $O_2$ stream with the RFG stream. The modified conduit 835 may also be useful for instances where the RFG conduit 35p,s is made from carbon steel. As discussed above, safety concerns may limit the local $O_2$ concentration at the conduit wall for carbon steel conduits to a predetermined amount, such as 23.5%. If the flow rate of the $O_2$ stream is set to enrich the RFG stream to an $O_2$ concentration at or below the predetermined amount, the local concentration may still exceed this amount before the RFG/$O_2$ stream becomes homogenous. The C-D profile aids in preventing a high local $O_2$ concentration at the conduit wall during mixing.

Figure 9A:
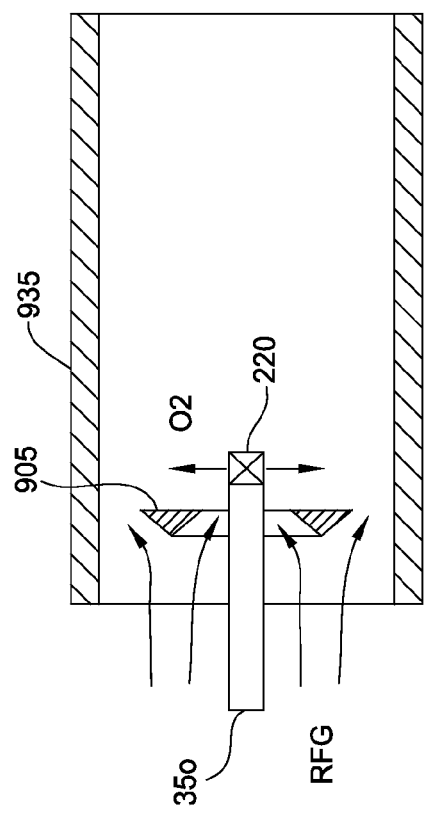
FIGS. 9A and 9B illustrate the mixer and a flow diverter, according to another embodiment of the present invention.
Figure 9B:
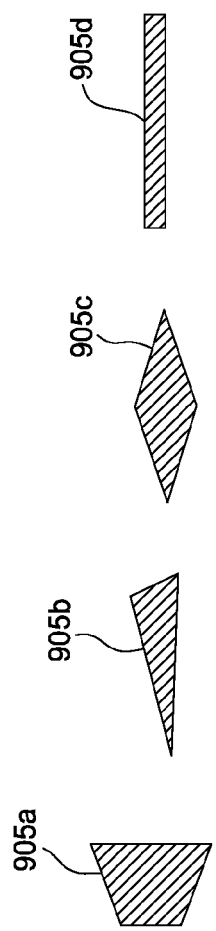

FIGS. 9A and 9B illustrate the mixer 220 and a flow diverter 905 installed in a modified conduit section 935, according to another embodiment of the present invention. The modified conduit section 935 may be used with one of the RFG conduits 35p,s or both. This embodiment is also useful for carbon steel conduits. The flow diverter 905 is disposed in the conduit 935 longitudinally proximate to the mixer 20p,s. The diverter 905 may be located upstream of the mixer 220, downstream of the mixer 220 or longitudinally aligned with the mixer 220. The diverter 905 may be a circular ring where the conduit 935 is a pipe or a square duct and an elliptical ring where the conduit 935 is a non-square, rectangular duct. Alternatively, the diverter 905 may be a rectangular strip where the conduit 935 is a duct. The diverter 905 divides the RFG stream into a first portion directed toward the mixer 220 and a second portion directed toward a wall of the conduit 935. The first portion is accelerated toward the $O_2$ stream exiting the mixer 220 and promotes mixing due to enhanced turbulence. The second portion is accelerated toward the walls of the conduit 935 and serves as a barrier to limit the local $O_2$ concentration at the conduit 935 wall. The cross-section of the diverter 905 may be a right triangle as shown in FIG. 9A or a trapezoid 905a, another type of triangle 905b, a diamond 905c, or a rectangle 905d as shown in FIG. 9B. Other shapes, such as other polygons or curved shapes, such as circles or ellipses may be used as well.

Figure 10:
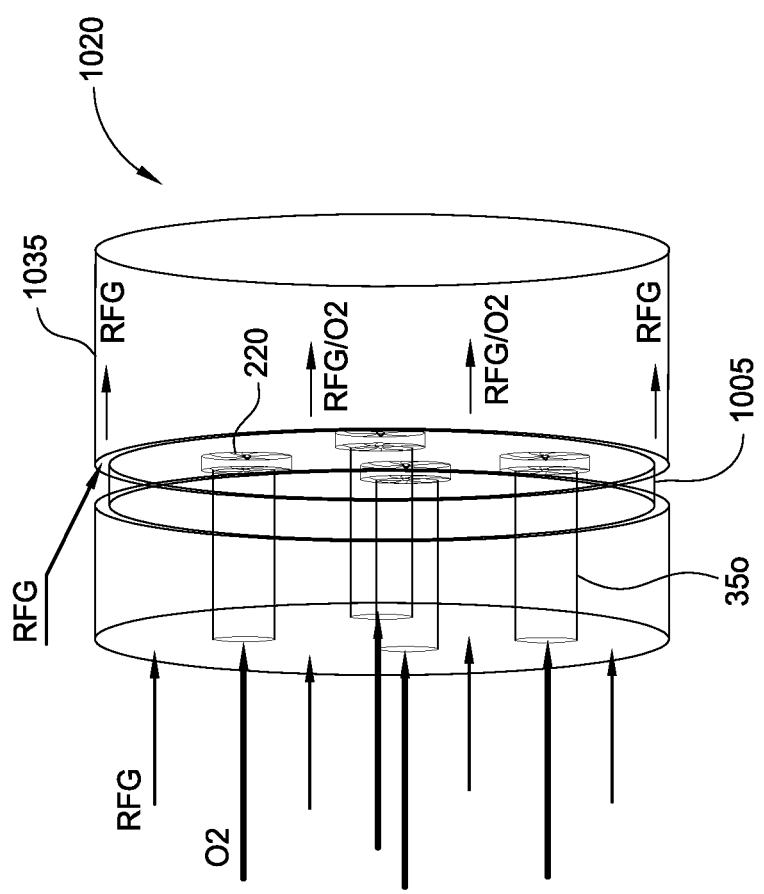
FIG. 10 illustrates a mixer arrangement and an injector, according to another embodiment of the present invention.

FIG. 10 illustrates a mixer arrangement 1020 and an injector 1005 installed in a modified conduit section 1035, according to another embodiment of the present invention. The modified conduit section 1035 may be used with one of the RFG conduits 35p,s or both. This embodiment is also useful for carbon steel conduits. The arrangement 1020 may be four identical mixers 220 staggered in a parallel relationship, the arrangement 520p,s or any alternatives discussed therewith, or may simply be a single mixer 220. The injector 1005 is disposed in the RFG conduit 1035 longitudinally proximate to the mixer 220. The injector 1005 may be located upstream of the mixer arrangement 1020, downstream of the mixer arrangement 1020 or longitudinally aligned with the mixer arrangement 1020. The injector 1005 may be a circular ring where the conduit 1035 is a pipe or a square duct and an elliptical ring where the conduit 1035 is a non-square, rectangular duct. Alternatively, the injector 1005 may be a rectangular strip where the conduit 1035 is a duct.

A plurality of nozzles (not shown) are spaced around the injector and oriented in a downstream direction. A portion of the RFG stream is diverted from the RFG conduit 1035 via an injection conduit (not shown and located upstream of the injector and mixer arrangement) and delivered to the injector. A control valve or damper (not shown) may be disposed in the injection line and in communication with a controller (not shown) to regulate the flow rate of the diverted portion. The diverted stream is accelerated through the nozzles along an inner surface of the RFG conduit 1035, thereby serving as a barrier to limit the local $O_2$ concentration at the conduit 1035 wall. The diverted portion of the RFG stream the ring may range from 1-50% or be 20% of the flow rate of the RFG stream.

Figure 11:
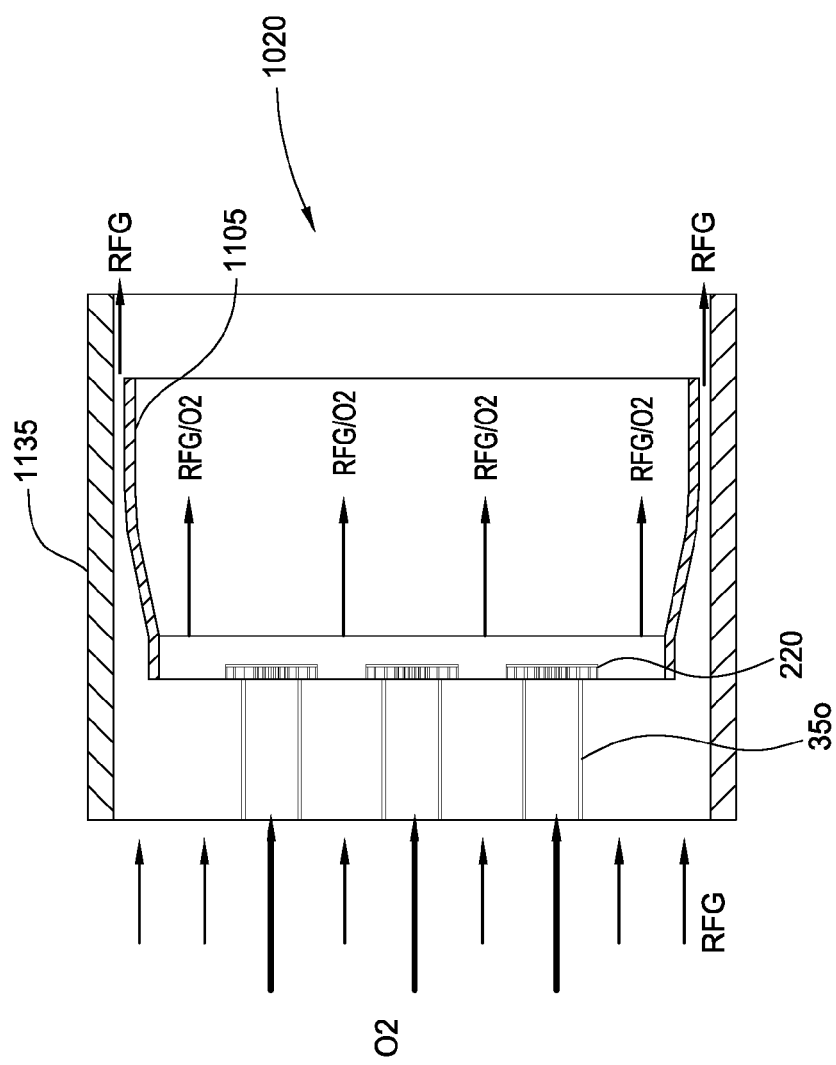
FIG. 11 illustrates the mixer arrangement and a shield, according to another embodiment of the present invention.

FIG. 11 illustrates the mixer arrangement 1020 and a shield 1105 installed in a modified conduit section 1135, according to another embodiment of the present invention. The modified conduit section 1135 may be used with one of the RFG conduits 35p,s or both. This embodiment is also useful for carbon steel conduits. The shield is disposed in the RFG conduit 1135 longitudinally proximate to the mixer arrangement 1020. The shield 1105 may be located upstream of the mixer arrangement 1020, downstream of the mixer arrangement 1020 or longitudinally aligned with the mixer arrangement 1020. The shield 1105 may be a circular sleeve where the conduit 1135 is a pipe or a square duct and an elliptical sleeve where the conduit 1135 is a non-square, rectangular duct. Alternatively, the shield 1105 may be a rectangular plate where the conduit 1135 is a duct. The shield 1105 may be made from a metal or alloy, such as stainless steel or inconnel, or a ceramic.

The shield 1105 has a first diameter (or length if rectangular) and a second diameter, which is greater than the first diameter. A wall of the shield 1105 tapers between the two diameters. Both diameters are less than an inner diameter (or length if rectangular) of the conduit 1135, thereby defining a tapered passage between an outer surface of the shield and an inner surface of the conduit. The shield 1105 is oriented in the conduit so that the passage converges along a flow direction of the RFG stream. A portion of the RFG stream is diverted through the tapered passage and the wall of the shield 1105 is a physical barrier to the $O_2$ stream exiting the mixer arrangement. The tapered shield passage accelerates the diverted RFG stream so that it continues to serve as a barrier downstream of the shield 1105, thereby limiting the local $O_2$ concentration at the conduit 35p,s wall. A length of the shield 1105 may vary based upon a transient mixing profile of the RFG and $O_2$ streams, which depends on several factors.

In another alternative embodiment (not shown), a longitudinal portion of a carbon steel RFG conduit 35p,s proximate to the mixer or mixer arrangement may be replaced by a portion made from any of the materials discussed above for the shield 1105. The length of the portion would also depend on the transient mixing profile of the RFG and $O_2$ streams.

Alternatively, some or all of the mixer embodiments discussed above (i.e., those illustrated in FIGS. 2-11) may be used to efficiently diffuse large quantities of any second or mixing gas into large quantities of any first or main gas. The two gases may be any type of gases which need to be mixed and may even contain liquid droplets or solid particles. Specific examples include the oxygen enrichment of air, the manufacture of dichloroethane by oxychlorination of ethylene, the manufacture of ethylene oxide and ethylene glycol by epoxidation of ethylene, the manufacture of acrylonitrile by aminoxidation of propylene, or the manufacture of maleic anhydride by oxidation of N-butane; in refining, for example for the doping of regenerators of catalytic cracking, or the enrichment of air in the CLAUS processes; the manufacture of oxygenated water by the ethylhydroanthraquinone process, the oxidation of sulfur dioxide ($SO_2$) into sulfur trioxide ($SO_3$), the manufacture of nitric acid by oxidation of ammonia, or more generally any process of oxidation intended to produce metallic oxides. Additional examples include using oxygen-enriched air combustion or oxy-combustion for glass melting, lime, and/or cement kilns or steel manufacturing.

Additional examples include mixing of fine powders, the two gases to be mixed, possibly identical, being loaded with particles of different powders, which are mixed in the gas mixtures, and are then collected in a separator with low charge losses.

Advantageously, some or all of the mixer embodiments discussed above allow enrichment of the first or main gas stream by the second or mixing gas stream of amounts greater or substantially greater than 12%, such as 15%, 20%, 25%, 30%, or 35%. As an example (discussed above), enrichment of RFG stream with initial concentration of about 3% $O_2$ to a final oxygen concentration of about 23.5% (enrichment of about 20%). Alternatively, some or all of the mixer embodiments discussed above may be used to enrich the main gas with the mixing gas by less than 12%.

In another embodiment, a method for generating heat energy includes injecting a stream having a concentration of at least 50% oxygen ($O_2$ stream) into a primary gas stream through a mixer, the mixer discharging the $O_2$ stream as two or more spaced jets traversing the primary stream, thereby enriching the primary gas stream. The method further includes mixing fuel with the enriched primary gas stream, thereby forming a fuel stream; and combusting the fuel stream, thereby forming a flue gas stream.

In one aspect of the embodiment, the method further includes recycling a substantial portion of the flue gas stream, thereby forming a recycled flue gas stream (RFG), wherein the primary gas stream is fed by the RFG stream. The enriched primary gas stream may have an oxygen concentration of 15-40%. The enriched primary gas stream may have an oxygen concentration of 17-23.5%. The enriched primary gas stream may have an oxygen concentration of 18-21%. The method may further include capturing the remaining portion of the flue gas stream.

In another aspect of the embodiment, the method further includes further comprising injecting a second stream having a concentration of at least 50% oxygen into a secondary gas stream through a second mixer, the second mixer discharging the second $O_2$ stream as two or more spaced jets traversing the secondary stream, thereby enriching the secondary gas stream, wherein the enriched secondary stream is combusted with the fuel stream. The method may further include recycling a substantial portion of the flue gas stream, thereby forming a recycled flue gas stream (RFG), wherein the primary and secondary gas streams are fed by the RFG stream. The enriched primary gas stream may have an $O_2$ concentration of 18-21% and the enriched secondary gas stream may have an $O_2$ concentration of 21-40%.

In another aspect of the embodiment, the method further includes sensing an $O_2$ concentration of the enriched stream and controlling a flow rate of the $O_2$ stream based on the measured $O_2$ concentration. In another aspect of the embodiment, the mixer discharges the jets as swirling jets. In another aspect of the embodiment, the mixer is fed by a conduit and the mixer extends outward past the conduit. In another aspect of the embodiment, the plane is perpendicular to the longitudinal flow direction. In another aspect of the embodiment, the $O_2$ concentration of the $O_2$ stream is at least 90%.

In another aspect of the embodiment, the $O_2$ stream is injected through the mixer and a second mixer and the mixers are longitudinally aligned. The method may further include sensing $O_2$ concentrations at a location downstream from the mixers and controlling a flow rate of oxygen through each mixer based on the measured $O_2$ concentrations. The downstream location may be proximate to the mixers. The downstream location may be distal from the mixers. The mixer may be larger than the second mixer. The second mixer may be shut-in for transient operation.

In another aspect of the embodiment, the $O_2$ stream is injected through the mixer, a second mixer, and a third mixer and the mixers are longitudinally aligned in a staggered arrangement. In another aspect of the embodiment, the $O_2$ stream is injected through a first mixer and a second mixer and the mixers are longitudinally spaced. In another aspect of the embodiment, the method further includes diluting the $O_2$ stream for transient operation. The method may further include diverting a portion of the primary stream, wherein the $O_2$ stream is diluted with the diverted portion. A flow rate of the diluted $O_2$ stream may be the same as a flow rate of the $O_2$ stream In another aspect of the embodiment, the method further includes inducing turbulence in the primary stream. In another aspect of the embodiment, the primary stream is transported through a carbon steel conduit and the method further includes diverting and accelerating a portion of the primary stream to limit a maximum oxygen concentration at a wall of the conduit during enrichment of the primary stream. In another aspect of the embodiment, the fuel is pulverized solid fuel.

In another embodiment, a mixer for diffusing a second gas stream into a first gas stream includes a head. The head includes a base and a plurality of vanes formed or disposed on a surface of the base, the vanes extending from a central portion of the base to a periphery of the base and, along with the base, defining flow channels. The mixer further includes an inlet having a wall and a longitudinal passage formed through the wall, the passage in fluid communication with the channels, wherein: each flow direction of each channel traverses a flow direction of the passage, and the periphery of the base extends outward past the wall of the inlet.

In one aspect of the embodiment, the base is circular. In another aspect of the embodiment, the base is rectangular. In another aspect of the embodiment, the vanes are curved. At least one of the vanes may have a first curvature and at least one of the vanes may have a second curvature which is greater than the first curvature. In another aspect of the embodiment, the mixer further includes a tapered transition member extending along an outer surface of the inlet wall. In another aspect of the embodiment, the wall of the inlet is tapered. In another aspect of the embodiment, the mixer further includes a valve member movable to selectively cover or expose the channels. The mixer may further include an actuator operably coupled to the valve member. In another aspect of the embodiment, the mixer further includes at least one vane extending past a periphery of the base.

In another aspect of the embodiment, an assembly for diffusing a second gas stream into a first gas stream includes a conduit; the mixer disposed in the conduit; and a second like mixer disposed in the conduit. The mixers may be longitudinally aligned in the conduit. The mixers may be longitudinally spaced in the conduit. The assembly may further include a third like mixer, wherein the mixers are longitudinally aligned in a staggered arrangement in the conduit. The mixer may be larger than the second mixer. The assembly may further include a mixer conduit coupled to the inlet of each mixer; a control valve or damper disposed in each mixer conduit; a plurality of second gas sensors disposed in the conduit downstream of the mixers, the sensors longitudinally aligned in the conduit; and a controller in communication with the control valves or dampers and the second gas sensors.

In another aspect of the embodiment, an assembly for diffusing a second gas stream into a first gas stream includes: a main conduit; the mixer disposed in the conduit; a mixer conduit coupled to the inlet of the mixer; a dilution conduit in fluid communication with the main conduit at a location upstream of the mixer and in fluid communication with the mixer conduit; a first control valve or damper disposed in the dilution conduit; a second control valve or damper disposed in the mixer conduit; and a controller in communication with the control valves or dampers.

In another aspect of the embodiment, a method of generating heat energy, includes: injecting a stream having a concentration of at least 50% oxygen ($O_2$ stream) into a recycled flue gas (RFG) stream through the mixer, thereby enriching the RFG stream; and combusting the enriched RFG stream, thereby forming a flue gas stream. The method may further include recycling a substantial portion of the flue gas stream and capturing the remaining portion of the flue gas stream.

In another aspect of the embodiment, the head further includes a deflector disposed or formed on the central portion of the base. In another aspect of the embodiment, the head is made from a metal or alloy. The metal or alloy may be stainless steel. In another aspect of the embodiment, the head further includes a cover disposed on a peripheral portion of a surface of the blades adjacent the inlet, the peripheral portion extending outward past the wall of the inlet.

In another embodiment, an assembly for diffusing a second gas stream into a first gas stream includes a first conduit section. The first conduit section has a wall defining a passage therethrough. The assembly further includes a first mixer disposed in the first conduit section. The mixer includes a base; and a plurality of vanes formed or disposed on a surface of the base, the vanes extending from a central portion of the base to a periphery of the base and, along with the base, defining flow channels, wherein each flow direction of each channel traverses a flow direction of the passage. The assembly further includes a second mixer disposed in the first conduit section in longitudinal alignment with the first mixer. The second mixer includes: a base; and a plurality of vanes formed or disposed on a surface of the base, the vanes extending from a central portion of the base to a periphery of the base and, along with the base, defining flow channels, wherein each flow direction of each channel traverses the flow direction of the passage.

In one aspect of the embodiment, the first mixer is larger than the second mixer. The first mixer may be centrally arranged in the first conduit section and the second mixer may be peripherally arranged relative to the first mixer.

In another aspect of the embodiment, the assembly further includes: a mixer conduit coupled to an inlet of each mixer; a control valve or damper disposed in each mixer conduit; a plurality of second gas sensors disposed in the first conduit section downstream of the mixers, the sensors longitudinally aligned in the first conduit section; and a controller in communication with the control valves or dampers and the second gas sensors.

In another aspect of the embodiment, the assembly further includes a third mixer identical to the second mixer, wherein the mixers are in a staggered arrangement in the conduit. In another aspect of the embodiment, the assembly further includes a third mixer identical to the second mixer, wherein the mixers are in an in-line arrangement in the conduit.

In another aspect of the embodiment, a method of generating heat energy includes flowing a recycled flue gas stream (RFG) stream through the first conduit section; injecting a stream having a concentration of at least 50% oxygen ($O_2$ stream) into the RFG stream through the mixer, thereby enriching the RFG stream; and combusting the enriched RFG stream, thereby forming a flue gas stream. The method may further include recycling a substantial portion of the flue gas stream and capturing the remaining portion of the flue gas stream.

In another embodiment, an assembly for diffusing a second gas stream into a first gas stream includes a first conduit section. The first conduit section has an irregular wall to promote diffusion of the second gas stream into the first gas stream and a longitudinal passage formed through the wall. The assembly further includes a mixer disposed in the first conduit section proximate to the irregular wall. The mixer includes a head. The head includes a base; and a plurality of vanes formed or disposed on a surface of the base, the vanes extending from a central portion of the base to a periphery of the base and, along with the base, defining flow channels, wherein each flow direction each channel traverses a flow direction of the passage.

In one aspect of the embodiment, the mixer further includes an inlet having a wall and a longitudinal passage formed through the wall, the mixer passage in fluid communication with the channels and the periphery of the base extends outward past the inlet wall. In another aspect of the embodiment, a protrusion is formed on an inner surface of the conduit wall. The protrusion may continuously extend around the inner surface of the conduit wall. The protrusion may be a plurality of protrusions spaced around the inner surface of the conduit wall. The protrusion may continuously extend around and longitudinally along the inner surface of the conduit wall. The protrusion may continuously extend around and longitudinally along the inner surface of the conduit wall.

In another aspect of the embodiment, the conduit wall forms a converging-diverging profile. In another aspect of the embodiment, the conduit is a duct or a pipe. In another aspect of the embodiment, the conduit wall transitions from rectangular to curved and back to rectangular.

In another aspect of the embodiment, the assembly further includes a second mixer disposed in the first conduit section in longitudinal alignment with the mixer, the second mixer including: a base; and a plurality of vanes formed or disposed on a surface of the base, the vanes extending from a central portion of the base to a periphery of the base and, along with the base, defining flow channels; wherein each flow direction of each channel is traverses the flow direction of the passage. The assembly may further include a mixer conduit coupled to an inlet of each mixer; a control valve or damper disposed in each mixer conduit; a plurality of second gas sensors disposed in the first conduit section downstream of the mixers, the sensors longitudinally aligned in the first conduit section; and a controller in communication with the control valves or dampers and the second gas sensors.

In another aspect of the embodiment, a method of generating heat energy includes flowing a recycled flue gas stream (RFG) stream through the first conduit section; injecting a stream having a concentration of at least 50% oxygen ($O_2$ stream) into the RFG stream through the mixer, thereby enriching the RFG stream; and combusting the enriched RFG stream, thereby forming a flue gas stream. The method may further include recycling a substantial portion of the flue gas stream and capturing the remaining portion of the flue gas stream.

In another embodiment, an assembly for diffusing a second gas stream into a first gas stream includes a first conduit section. The first conduit section including a wall, a longitudinal passage formed through the wall, and a diverter, a longitudinal injector, or a shield disposed in the passage. The assembly further includes a mixer disposed in the first conduit section proximate to the diverter, longitudinal injector, or shield. The mixer includes a head. The head includes a base; and a plurality of vanes formed or disposed on a surface of the base, the vanes extending from a central portion of the base to a periphery of the base and, along with the base, defining flow channels, wherein each flow direction of each channel traverses a flow direction of the passage.

In one aspect of the embodiment, the mixer further includes an inlet having a wall and a longitudinal passage formed through the wall, the mixer passage in fluid communication with the channels and the periphery of the base extends outward past the inlet wall. In another aspect of the embodiment, the first conduit section is made from carbon steel. In another aspect of the embodiment, the first conduit section comprises the diverter, wherein the diverter is a ring or rectangular strip configured to divert a first portion of the first gas stream toward the mixer and a second portion of first gas stream toward a wall of the first conduit section. The diverter may have a polygonal cross-section.

In another aspect of the embodiment, the first conduit section includes the longitudinal injector disposed in a wall of the first conduit section, wherein the injector comprises a plurality of nozzles disposed therearound. The injector may be a ring or rectangular strip. The assembly may further include an injection conduit in fluid communication with the first conduit section at a location upstream of the injector and the mixer and in fluid communication with the injector. The assembly may further include a control valve or damper disposed in the injection conduit and a controller in communication with the control valve or damper. The assembly may further include a second mixer disposed in the first conduit section proximate to the injector.

In another aspect of the embodiment, the first conduit section includes the shield disposed proximate to a wall of the first conduit section, wherein a passage is defined between an outer surface of the shield and an inner surface of the wall. The shield may be made from stainless steel, inconnel, or ceramic. The passage may be tapered. The shield may be a sleeve or rectangular plate. The assembly may further include a second mixer disposed in the first conduit section proximate to the shield. A length of the shield may correspond to a transient mixing profile of the two gas streams.

In another aspect of the embodiment, The assembly further includes a second mixer disposed in the first conduit section in longitudinal alignment with the mixer, the second mixer including: a base; and a plurality of vanes formed or disposed on a surface of the base, the vanes extending from a central portion of the base to a periphery of the base and, along with the base, defining flow channels; wherein each flow direction of each channel is traverses the flow direction of the passage. The assembly may further include: a mixer conduit coupled to an inlet of each mixer; a control valve or damper disposed in each mixer conduit; a plurality of second gas sensors disposed in the first conduit section downstream of the mixers, the sensors longitudinally aligned in the first conduit section; and a controller in communication with the control valves or dampers and the second gas sensors.

In another aspect of the embodiment, a method of generating heat energy includes flowing a recycled flue gas stream (RFG) stream through the first conduit section; injecting a stream having a concentration of at least 50% oxygen ($O_2$ stream) into the RFG stream through the mixer, thereby enriching the RFG stream; and combusting the enriched RFG stream, thereby forming a flue gas stream. The method may further include recycling a substantial portion of the flue gas stream and capturing the remaining portion of the flue gas stream.

In another embodiment, a method of diffusing a second gas stream into a first gas stream includes flowing the first gas stream through a conduit. The method further includes injecting the second gas stream into the first gas stream through a mixer disposed in the conduit, the mixer discharging the stream of the second gas as two or more spaced jets traversing the first stream, thereby forming a mixed stream, wherein a concentration of the second gas in the mixed stream is C2m, a concentration of the second gas in the first gas stream is C2f, and C2m-C2f is greater than 12%.

In one aspect of the embodiment, the second gas has a concentration of at least 50% oxygen ($O_2$ stream). The first gas may be flue gas. The method may further include recycling a substantial portion of the mixed gas stream and capturing the remaining portion of the mixed gas stream. A first portion of the conduit may be made from carbon steel and a second portion of the conduit proximate to the mixer is made from stainless steel, inconnel, or ceramic. The first gas may be air.

In another aspect of the embodiment, C2m-C2f is greater than 15%. In another aspect of the embodiment, C2m-C2f is greater than 20%. In another aspect of the embodiment, C2m-C2f is greater than 25%. In another aspect of the embodiment, C2m-C2f is greater than 30%. In another aspect of the embodiment, the second gas stream is injected through the mixer and a second mixer disposed in the conduit and the mixers are longitudinally aligned. The method may further include sensing a concentration of the second gas at a location in the conduit downstream from the mixers and controlling a flow rate of the second gas stream through each mixer based on the measured second gas concentration.

In another aspect of the embodiment, the method further includes diluting the second gas stream for transient operation. The method may further include diverting a portion of the first gas stream, wherein the second gas stream is diluted with the diverted portion. A flow rate of the diluted second gas stream may be the same as a flow rate of the second gas stream.

In another embodiment, a method for generating heat energy includes injecting a stream having a concentration of at least 50% oxygen ($O_2$ stream) into a recycled flue gas stream (RFG) through a mixer, the mixer discharging the $O_2$ stream as two or more spaced jets traversing the RFG stream, thereby enriching the RFG stream. The method further includes combusting the enriched RFG stream, thereby forming a flue gas stream.

In one aspect of the embodiment, the RFG stream has an $O_2$ concentration of about 2-6%. In another aspect of the embodiment, the method may further include recycling a substantial portion of the flue gas stream and capturing the remaining portion of the flue gas stream.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for generating heat energy, comprising:
    injecting an $O_2$ stream having a concentration of at least 90% oxygen from an air separation unit into a primary gas stream through a mixer, the mixer discharging the $O_2$ stream as two or more spaced jets traversing the primary stream, thereby enriching the primary gas stream;
    mixing solid fuel with the enriched primary gas stream, thereby forming a fuel stream;
    injecting the fuel stream into a combustion chamber of a boiler; and
    combusting the fuel stream inside the combustion chamber, thereby forming a flue gas stream.

2. The method of claim 1, further comprising recycling a substantial portion of the flue gas stream, thereby forming a recycled flue gas stream, wherein the primary gas stream is fed by the recycled flue gas stream.

3. The method of claim 2, wherein the enriched primary gas stream has an oxygen concentration of 15-40%.

4. The method of claim 2, wherein the enriched primary gas stream has an oxygen concentration of 17-23.5%.

5. The method of claim 2, wherein the enriched primary gas stream has an oxygen concentration of 18-21%.

6. The method of claim 2, further comprising capturing the remaining portion of the flue gas stream.

7. The method of claim 1, further comprising injecting a second stream having a concentration of at least 50% oxygen into a secondary gas stream through a second mixer, the second mixer discharging the second $O_2$ stream as two or more spaced jets traversing the secondary stream, thereby enriching the secondary gas stream, wherein the enriched secondary stream is injected into the combustion space where it is combusted with the fuel stream.

8. The method of claim 7, further comprising recycling a substantial portion of the flue gas stream, thereby forming a recycled flue gas stream, wherein the primary and secondary gas streams are fed by the recycled flue gas stream.

9. The method of claim 8, wherein the enriched primary gas stream has an $O_2$ concentration of 18-21% and the enriched secondary gas stream has an $O_2$ concentration of 21-40%.

10. The method of claim 1, wherein the mixer discharges the jets as swirling jets.

11. The method of claim 1, wherein the mixer is fed by a conduit and the mixer extends outward past the conduit.

12. The method of claim 1, wherein the plane is perpendicular to the longitudinal flow direction.

13. The method of claim 1, wherein the $O_2$ concentration of the $O_2$ stream is at least 90%.

14. The method of claim 1, wherein the $O_2$ stream is injected through the mixer, a second mixer, and a third mixer and the mixers are longitudinally aligned in a staggered arrangement.

15. The method of claim 1, wherein the $O_2$ stream is injected through a first mixer and a second mixer and the mixers are longitudinally spaced.

16. The method of claim 1, further comprising diluting the $O_2$ stream for transient operation.

17. The method of claim 1, further comprising inducing turbulence in the primary stream.

18. The method of claim 1, wherein the solid fuel is pulverized coal.

19. A method for generating heat energy, comprising:
    injecting a stream having a concentration of at least 90% oxygen ($O_2$ stream) from an air separation unit into a primary gas stream through a mixer, the mixer discharging the $O_2$ stream as two or more spaced jets traversing the primary stream, thereby enriching the primary gas stream;

mixing solid fuel with the enriched primary gas stream, thereby forming a fuel stream;

combusting the fuel stream, thereby forming a flue gas stream; and sensing an $O_2$ concentration of the enriched stream and controlling a flow rate of the $O_2$ stream based on the measured $O_2$ concentration.

20. A method for generating heat energy, comprising:

injecting a stream having a concentration of at least 90% oxygen ($O_2$ stream) from an air separation unit into a primary gas stream through a mixer, the mixer discharging the $O_2$ stream as two or more spaced jets traversing the primary stream, thereby enriching the primary gas stream;

mixing solid fuel with the enriched primary gas stream, thereby forming a fuel stream; and combusting the fuel stream, thereby forming a flue gas stream, wherein the $O_2$ stream is injected through the mixer and a second mixer and the mixers are longitudinally aligned.

21. The method of claim 20, further comprising sensing $O_2$ concentrations at a location downstream from the mixers and controlling a flow rate of oxygen through each mixer based on the measured $O_2$ concentrations.

22. The method of claim 21, wherein the downstream location is proximate to the mixers.

23. The method of claim 21, wherein the downstream location is distal from the mixers.

24. The method of claim 20, wherein the mixer is larger than the second mixer.

25. The method of claim 20, wherein the second mixer is shut-in for transient operation.

26. A method for generating heat energy, comprising:

diverting a portion of a primary gas stream;

diluting an $O_2$ stream with the diverted portion for transient operation;

injecting a stream having a concentration of at least 90% oxygen ($O_2$ stream) from an air separation unit into the diverted portion of the primary gas stream through a mixer, the mixer discharging the $O_2$ stream as two or more spaced jets traversing the primary stream, thereby enriching the diverted portion of the primary gas stream;

mixing solid fuel with the enriched diverted portion of the primary gas stream, thereby forming a fuel stream; and combusting the fuel stream, thereby forming a flue gas stream.

27. The method of claim 26, wherein a flow rate of the diluted $O_2$ stream is the same as a flow rate of the $O_2$ stream.

28. A method for generating heat energy, comprising:

transporting a primary gas stream through a carbon steel conduit;

injecting a stream having a concentration of at least 90% oxygen ($O_2$ stream) from an air separation unit into the primary gas stream through a mixer, the mixer discharging the $O_2$ stream as two or more spaced jets traversing the primary stream, thereby enriching the primary gas stream, wherein a portion of the primary stream is diverted and accelerated to limit a maximum oxygen concentration at a wall of the conduit during enrichment of the primary gas stream;

mixing solid fuel with the enriched primary gas stream, thereby forming a fuel stream; and combusting the fuel stream, thereby forming a flue gas stream.

* * * * *